United States Patent
Shirakawa et al.

(10) Patent No.: US 8,847,927 B2
(45) Date of Patent: Sep. 30, 2014

(54) INFORMATION PROCESSING APPARATUS AND COMPUTER-READABLE STORAGE MEDIUM HAVING STORED THEREIN INFORMATION PROCESSING PROGRAM

(75) Inventors: Mari Shirakawa, Kyoto (JP); Akito Oshizawa, Kyoto (JP); Mitsuteru Ozawa, Shibuya-ku (JP)

(73) Assignee: Nintendo Co., Ltd., Kyoto (JP)

( * ) Notice: Subject to any disclaimer, the term of this patent is extended or adjusted under 35 U.S.C. 154(b) by 711 days.

(21) Appl. No.: 12/418,166

(22) Filed: Apr. 3, 2009

(65) Prior Publication Data

US 2010/0188344 A1    Jul. 29, 2010

(30) Foreign Application Priority Data

Jan. 26, 2009  (JP) ................................ 2009-014479

(51) Int. Cl.
 G06F 3/033  (2013.01)
 G06F 3/0488  (2013.01)
 G06F 3/0481  (2013.01)

(52) U.S. Cl.
 CPC .... *G06F 3/0488* (2013.01); *G06F 2203/04806* (2013.01); *G06F 3/0481* (2013.01); *G06F 3/04815* (2013.01)
 USPC ........... 345/179; 345/173; 345/670; 345/671; 345/663; 345/660; 345/684; 345/687; 345/688

(58) Field of Classification Search
 None
 See application file for complete search history.

(56) References Cited

U.S. PATENT DOCUMENTS

| | | | |
|---|---|---|---|
| 5,844,561 A | 12/1998 | Tanimoto et al. | |
| 8,212,780 B2 | 7/2012 | Mashimo | |
| 2002/0084974 A1 | 7/2002 | Ohshima et al. | |
| 2006/0019753 A1* | 1/2006 | Ohta | 463/43 |
| 2006/0052166 A1* | 3/2006 | Ohta | 463/36 |
| 2006/0077185 A1* | 4/2006 | Mashimo | 345/173 |
| 2006/0089198 A1* | 4/2006 | Sawatani et al. | 463/33 |
| 2006/0111182 A1* | 5/2006 | Nakanishi et al. | 463/36 |

(Continued)

FOREIGN PATENT DOCUMENTS

| | | |
|---|---|---|
| JP | 60-196836 A | 10/1985 |
| JP | 06-187089 | 7/1994 |

(Continued)

OTHER PUBLICATIONS

Notification of Reasons for Refusal mailed Oct. 9, 2012 in Japanese Application No. JP 2009-014479, with English Translation (9 pages).

*Primary Examiner* — Joseph Feild
*Assistant Examiner* — Ifedayo Iluyomade
(74) *Attorney, Agent, or Firm* — Nixon & Vanderhye P.C.

(57) ABSTRACT

An information processing apparatus includes a pointing device and a display section for displaying an image. A coordinate detection section detects coordinates pointed to by the pointing device. A first change amount calculation section calculates a change amount of the coordinates in a first direction, the coordinates obtained when inputting is continuously performed by the pointing device. A second change amount calculation section a change amount of the coordinates in a second direction, the coordinates obtained when inputting is continuously performed by the pointing device. A first operation section performs a first operation based on the change amount in the first direction, the change amount calculated by the first change amount calculation section. A second operation section performs, based on the change amount in the second direction, a second operation different from the first operation, the change amount calculated by the second change amount calculation section.

12 Claims, 12 Drawing Sheets

(56) References Cited

U.S. PATENT DOCUMENTS

| | | | |
|---|---|---|---|
| 2006/0121985 A1* | 6/2006 | Nakanishi et al. | 463/36 |
| 2007/0226646 A1* | 9/2007 | Nagiyama et al. | 715/784 |
| 2008/0297492 A1* | 12/2008 | Shirakawa et al. | 345/179 |
| 2008/0300033 A1* | 12/2008 | Shirakawa et al. | 463/9 |
| 2009/0085935 A1* | 4/2009 | Yamashita et al. | 345/660 |
| 2009/0128507 A1* | 5/2009 | Hoshino et al. | 345/173 |
| 2009/0160793 A1* | 6/2009 | Rekimoto | 345/173 |

FOREIGN PATENT DOCUMENTS

| | | | | |
|---|---|---|---|---|
| JP | 9-120403 A | | 5/1997 | |
| JP | 2000207079 | * | 7/2000 | ............ G06F 15/02 |
| JP | 2003-233464 A | | 8/2003 | |
| JP | 2003-308514 A | | 10/2003 | |
| JP | 2004-078720 | | 3/2004 | |
| JP | 2006-102327 | | 4/2006 | |
| JP | 2007-264807 A | | 10/2007 | |

* cited by examiner

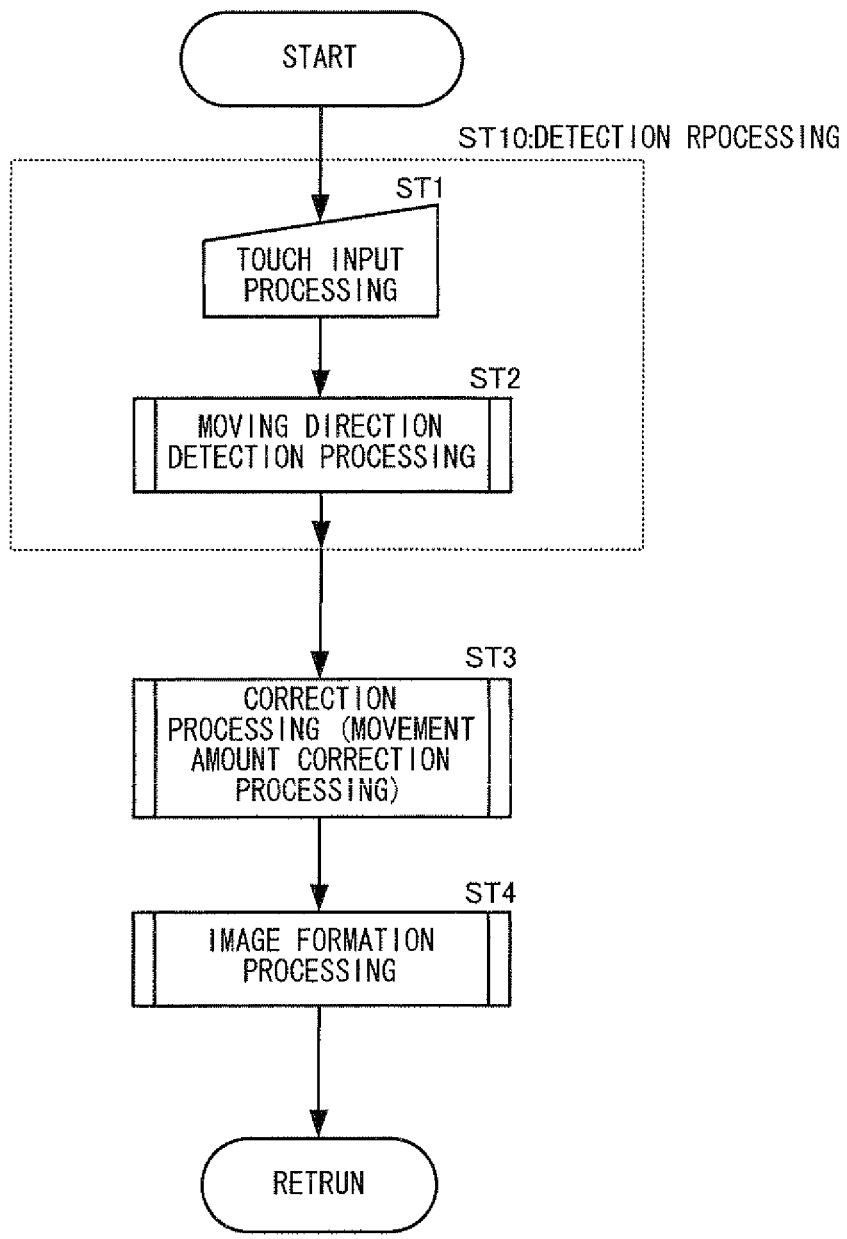

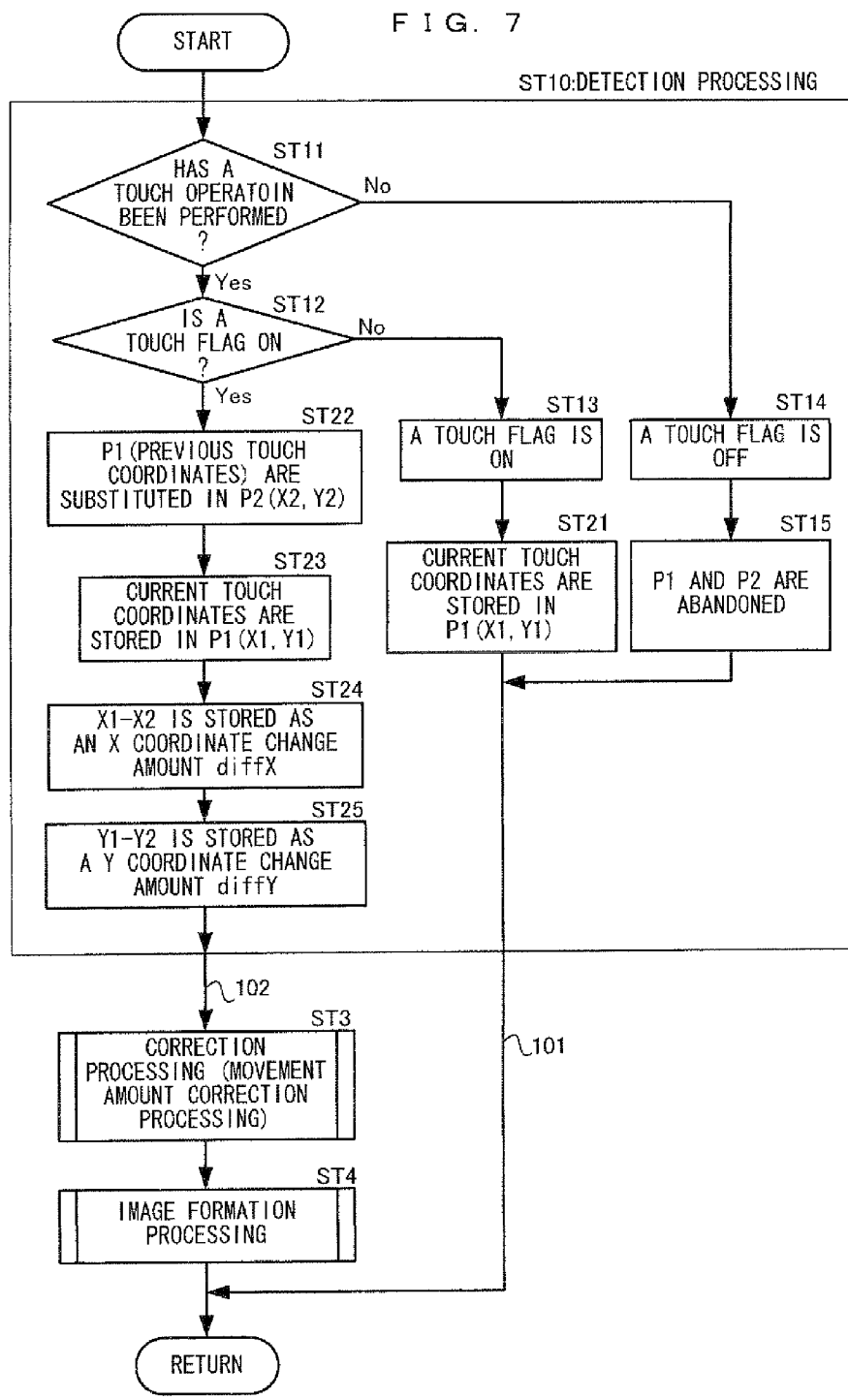

F I G. 1 3

| X DIRECTION MOVEMENT AMOUNT | 0.25 | 0.5 | 0.75 | 1 | 2 | 3 | 4 |
|---|---|---|---|---|---|---|---|
| CORRECTION VALUE | 0.1 | 0.45 | 0.71 | 1.1 | 2.3 | 3.2 | 4.1 |
| Y DIRECTION MOVEMENT AMOUNT | 0.25 | 0.5 | 0.75 | 1 | 2 | 3 | 4 |
| CORRECTION VALUE | 0.09 | 0.43 | 0.7 | 1.0 | 2.1 | 3.1 | 4.1 |

66

INFORMATION PROCESSING APPARATUS AND COMPUTER-READABLE STORAGE MEDIUM HAVING STORED THEREIN INFORMATION PROCESSING PROGRAM

CROSS REFERENCE TO RELATED APPLICATION

The disclosure of Japanese Patent Application No. 2009-014479, filed on Jan. 26, 2009, is incorporated herein by reference.

BACKGROUND AND SUMMARY

The technology presented herein relates to an information processing apparatus including a pointing device, a computer-readable storage medium having stored therein an information processing program, and the like.

Conventionally, an information processing apparatus which performs processing of a game or the like in accordance with a sliding operation or a dragging operation conducted by using a pointing device has been known. For example, Japanese Laid-Open Patent Publication No. 2006-102327 discloses an information processing apparatus in which a ring-shaped marker is displayed on a touch panel and by sliding and moving the marker, various operations are performed in accordance with positions to which the marker moves. More specifically, it is disclosed therein that a detection area on the touch panel is set so as to be divided into a plurality of areas in a grid-like manner and when a user moves the marker to a predetermined area, this apparatus changes a state, in which an image is displayed, based on a parameter which has been set for each of the plurality of areas (see FIG. 6, FIG. 13, and the like of Japanese Laid-Open Patent Publication No. 2006-102327).

Japanese Laid-Open Patent Publication No. 6-187089 discloses a method used with a pen input device, in which movement amounts of a pen in an X-axis direction and a Y-axis direction and an inclination of the pen are calculated and concurrent scrolling in the X-axis direction and the Y-axis direction is performed in accordance with the inclination.

Japanese Laid-Open Patent Publication No. 2004-78720 discloses a pointing device for presentation, with which coordinates of a movement amount are detected, a vertical direction component and a horizontal direction component of the movement amount are compared, and processing is performed based on one of them, which is larger than the other, by deeming that there is an input for causing the movement in either the vertical direction or the horizontal direction.

However, the apparatus disclosed in Japanese Laid-Open Patent Publication No. 2006-102327 changes the image based on the parameter set for the area which corresponds to a position pointed to by the ring-shaped marker. Accordingly, unless the marker is dragged to the area by a user, the user cannot set the apparatus in a predetermined state. Therefore, it may be required of the user to greatly drag the marker depending on a current position of the marker, and otherwise, it may occur that the user cannot cause the apparatus to perform his or her intended operation. In addition, since each of the parameters has been set for each of the plurality of areas, there arises a problem that the user cannot freely perform his or her intended operation in his or her desired position. Moreover, even if the marker is dragged, while the marker remains in the same area before the movement, it may occur that the user cannot change the image.

In addition, Japanese Laid-Open Patent Publication No. 6-187089 discloses that an image is scrolled in any direction including an oblique direction. However, only one kind of an operation, which is scrolling, can be performed but a variety of operations cannot be concurrently performed.

Since the device disclosed in Japanese Laid-Open Patent Publication No. 2004-78720 determines in an inflexible manner that the movement is performed in either the vertical direction or the horizontal direction, particularly in a case where the user performs dragging on a small scale on the pointing device, it may occur that a direction to input which the user does not intend.

Therefore, a feature of the present technology is to enhance operability of an information processing apparatus.

The present technology has the following features. Note that hereinafter, in order to facilitate understanding, components and step numbers are provided in parentheses, but by no means limit the scope.

(1) An example embodiment presented herein is a computer-readable storage medium having stored therein an information processing program which causes a computer (CPU core 21) in an information processing apparatus (game apparatus 10) including a pointing device (touch panel 15, stick 16) to function as: coordinate detection means, first change amount calculation means, second change amount calculation means, first operation means, and second operation means.

The coordinate detection means (ST1, ST21, ST22, ST23) detects coordinates pointed to by the pointing device.

The first change amount calculation means (ST24) calculates a change amount (X component movement amount diffX) of the coordinates, in a first direction, which is obtained when inputting is continuously performed by the pointing device.

The second change amount calculation means (ST25) calculates a change amount (Y component movement amount diffY) of the coordinates, in a second direction, which is obtained when inputting is continuously performed by the pointing device.

The first operation means (ST4, ST401) performs a first operation based on the change amount, in the first direction, which is calculated by the first change amount calculation means.

The second operation means (ST4, ST402) performs a second operation different from the first operation, based on the change amount, in the second direction, which is calculated by the second change amount calculation means.

The above-mentioned first change amount calculation means and second change amount calculation means of the information processing apparatus calculates the change amount in the first direction and the change amount in the second direction, respectively. The first operation means and the second operation means perform the first operation and the second operation based on these change amounts. Accordingly, since in this configuration, the predetermined operation can be performed based on only the relative movement amounts and the moving directions unlike in the conventional configuration in which the operation is performed based on an area where an initial position is located before movement, it is not required to perform movement to a specific area in order to perform a predetermined operation. Thus, a user can readily issue an instruction to the information processing apparatus to perform the predetermined operations, regardless of a position where the pointing device starts inputting.

In addition, in this configuration, when the pointing device is continuously performing inputting, the change amount of the coordinates in the first direction and the change amount of the coordinates in the second direction are assigned as inputs instructed for the mutually different operations. Thus, the user can concurrently instruct the two mutually different operations while using one pointing means, namely, the pointing device.

The above-described effect allows operability of the information processing apparatus to be enhanced.

(2) The above-mentioned information processing program further causes the computer in the above-mentioned information processing apparatus to function as image outputting means (an instruction issued by a CPU core 21 to output an image to a first GPU 26 or a second GPU 27) for outputting the image (a first display image or a second display image) to display means (a first LCD 12 or a second LCD 12);

the above-mentioned first direction is a horizontal direction;

the above-mentioned second direction is a vertical direction;

the above-mentioned first operation is an operation of scrolling the image (ST401); and the above-mentioned second operation is an operation of zooming in and out the image (ST402). The above-mentioned image outputting means outputs the image formed by the first operation means and/or the second operation means (ST4 (ST401 and/or ST402)).

In this configuration, the user can instruct the two mutually different operations while using one pointing means, namely, the pointing device. Thus, the operability of the information processing apparatus can be enhanced.

(3) The above-mentioned information processing program may further cause the computer in the above-mentioned information processing apparatus to function as first correction value setting means (ST301), second correction value setting means (ST302), the above-mentioned first operation means (ST401), and the above-mentioned second operation means (ST402).

In this case, the first correction value setting means sets a first correction value for correcting the above-mentioned change amount based on the above-mentioned change amount in the first direction.

The second correction value setting means sets a second correction value for correcting the above-mentioned change amount based on the above-mentioned change amount in the second direction.

The first operation means performs the first operation based on the above-mentioned first correction value.

The second operation means performs the second operation based on the above-mentioned second correction value.

By using the first correction value setting means and the second correction value setting means, an unexpected operation caused by a user's hand jiggling or the like in a drag operation can be avoided and an operation which is not intended by the user can be reduced. Thus, the operability of the information processing apparatus can be enhanced.

In order to set the correction values, the first correction value setting means and the second correction value setting means may use values calculated by using, for example, formulae. In addition, a data table for converting the change amounts to the correction values may be stored and conversion to the correction values may be performed with reference to the data table. In a case where the data table is used, the first correction value setting means and the second correction value setting means may perform interpolation of correction values listed in the data table in order to obtain values which are not listed in the data table.

(4) The above-mentioned first correction value setting means may set the above-mentioned first correction value (valX(T)) of this time based on the above-mentioned first correction value (valX(T−1)) which has been set last time and on the above-mentioned change amount (diffX(T)) of this time in the first direction ((Equation 1), (Equation 2)).

The above-mentioned second correction value setting means may set the above-mentioned second correction value (valY(T)) of this time based on the above-mentioned second correction value (valY(T−1))) which has been set last time and on the above-mentioned change amount (diffY(T)) of this time in the second direction ((Equation 3), (Equation 4)).

Here, the flow of the correction processing performed by the above-mentioned first correction value setting means and the above-mentioned second correction value setting means is repeatedly performed. The correction value "which has been set last time" is a value calculated when the flow is repeated before the value of this time is calculated (a value calculated in the flow performed immediately before a correction value is newly going to be set).

In this configuration, since the information processing apparatus uses the correction value of the last time, a smooth and natural operational feeling can be provided to the user.

(5) The above-mentioned first correction value setting means may calculate an attenuation value by multiplying the above-mentioned first correction value of the last time by a value being larger than 0 and smaller than 1 (ST311) and set, as the above-mentioned first correction value of this time, a sum of a value obtained by multiplying the above-mentioned attenuation value by a first coefficient and a value obtained by multiplying the above-mentioned change amount in the first direction by a second coefficient (ST312).

In this case, the second correction value setting means calculates an attenuation value by multiplying the above-mentioned second correction value of the last time by a value being larger than 0 and smaller than 1 (ST321). In this case, the above-mentioned second correction value setting means sets, as the second correction value of this time, a sum of a value obtained by multiplying the above-mentioned attenuation value by a third coefficient and a value obtained by multiplying the above-mentioned change amount in the second direction by a fourth coefficient (ST322).

The information processing apparatus having this configuration corrects the change amount inputted by the pointing device so as to be small immediately after the movement is started and thereafter, corrects the change amount such that the above-mentioned change amount/unit time, namely, a moving velocity of the coordinates gradually approximates to a predetermined value. Accordingly, even if jiggling of the user's hand occurs in the drag operation, the jiggling is not immediately inputted as it is. An unexpected operation caused by the user's hand jiggling can be avoided. On the other hand, in a case where a drag operation amount is large or a duration during which inputting is performed by the pointing device is long, it is considered that the user intentionally issues an instruction to perform inputting in such a manner, not causing the hand jiggling. In this case, the information processing apparatus corrects the above-mentioned moving velocity so as to approximate to the predetermined value. Thus, the information processing apparatus can provide the user with a comfortable operational feeling, whereby the operability of the information processing apparatus is enhanced.

(6) The above-mentioned information processing program may further cause the computer in the above-mentioned information processing apparatus to function as first threshold value determination means (ST303) and second threshold value determination means (ST304).

The first threshold value determination means determines whether or not the above-mentioned change amount in the first direction exceeds a first threshold value.

The second threshold value determination means determines whether or not the above-mentioned change amount in the second direction exceeds a second threshold value.

When the above-mentioned first threshold value determination means determines that the change amount in the first direction exceeds the first threshold value, the above-mentioned first operation means performs the first operation (ST411).

When the above-mentioned second threshold value determination means determines that the change amount in the second direction exceeds the second threshold value, the above-mentioned second operation means performs the second operation (ST412).

The information processing apparatus having this configuration uses the first threshold value and the second threshold value and does not perform the first operation and the second operation unless these values are exceeded. Since the information processing apparatus performs such correction processing, even if the user's hand jiggling occurs, the change amount in the first direction and the change amount in the second direction, which are obtained when the jiggling occurs, are ignored, and therefore, the information processing apparatus does not input an instruction which is not intended by the user.

(7) The above-mentioned information processing program may further cause the computer in the above-mentioned information processing apparatus to function as computation means (ST421).

In this case, the computation means is further caused to function as computation means for computing the change amount in the first direction and the change amount in the second direction.

When a value obtained by the above-mentioned computation means is within a first predetermined range, the above-mentioned first operation means performs the above-mentioned first operation (ST422, ST423), and when the value obtained by the above-mentioned computation means is within a second predetermined range, the above-mentioned first operation means does not perform the above-mentioned first operation.

When a value obtained by the above-mentioned computation means is within the second predetermined range, the above-mentioned second operation means performs the above-mentioned second operation (ST424, ST425), and when the value obtained by the above-mentioned computation means is within the first predetermined range, the above-mentioned second operation means does not perform the above-mentioned second operation.

When the value obtained by the above-mentioned computation means is neither within the above-mentioned first predetermined range nor within the above-mentioned second predetermined range (ST426), the above-mentioned first operation means may perform the above-mentioned first operation (ST427) and the above-mentioned second operation means may perform the above-mentioned second operation (ST428).

Here, the hand jiggling naturally easily occurs, and it is extremely difficult for the user to input only the first change amount. In this respect, when the value obtained by the above-mentioned computation means is within the first predetermined range, even if the second change amount is inputted, the information processing apparatus having this configuration performs the first operation and does not perform the above-mentioned second operation. In addition, when the value obtained by the above-mentioned computation means is within the second predetermined range, this information processing apparatus performs the second operation and does not perform the above-mentioned first operation.

As described above, when the computational results of the change amount in the first direction and the change amount in the second direction are within the first predetermined range or the second predetermined range, the information processing apparatus having this configuration performs only one of the first operation and the second operation. For example, the operation can be controlled such that the user's intention that the first operation is desired to be performed and the second operation is desired not to be performed is comprehended. In addition, when the value is neither within the first range nor within the second range, the above-mentioned first operation means performs the above-mentioned first operation and the above-mentioned second operation means performs the above-mentioned second operation. Accordingly, the information processing apparatuses not perform a stereotyped operation, in which only either one of the operations is performed as conventionally, and can perform both of the first operation and the second operation depending on the user's instruction, thereby allowing a reduction of any operation which is not intended by the user.

(8) The computation means may compute a ratio of the above-mentioned change amount in the first direction and the above-mentioned change amount in the second direction.

Here, the hand jiggling easily occurs naturally, and it is extremely difficult for the user to input only the first change amount. In this respect, when the above-mentioned ratio is within the first predetermined range, even if the second change amount is inputted, the information processing apparatus having this configuration performs the first operation and does not perform the above-mentioned second operation. In addition, when the above-mentioned ratio is within the second predetermined range, this information processing apparatus performs the second operation and does not perform the above-mentioned first operation.

As described above, when the ratio of the change amount in the first direction and the change amount in the second direction is within the first predetermined range or the second predetermined range, the information processing apparatus having this configuration performs only one of the first operation and the second operation. For example, when the change amount in the first direction is largely changed as compared with the change amount in the second direction, the operation can be controlled such that the user's intention that the first operation is desired to be performed and the second operation is desired not to be performed is comprehended. In addition, when the ratio is neither within the first range nor within the second range, the above-mentioned first operation means performs the above-mentioned first operation and the above-mentioned second operation means performs the above-mentioned second operation. Accordingly, the information processing apparatus does not perform a stereotyped operation, in which only either one of the operations is performed as conventionally, and can perform both of the first operation and the second operation depending on the user's instruction, thereby allowing a reduction of any operation which is not intended by the user.

(9) The above-mentioned information processing program may further cause the computer in the information processing apparatus to function as computation means and third threshold value determination means.

In this case, the computation means computes the above-mentioned change amount in the first direction and the above-mentioned change amount in the second direction.

The third threshold value determination means determines whether or not the above-mentioned change amount in the first direction and/or the above-mentioned change amount in the second direction exceed/exceeds a third threshold value (ST44).

When the above-mentioned third threshold value determination means determines that neither of the above-mentioned change amount in the first direction and the above-mentioned change amount in the second direction exceeds the third threshold value, the above-mentioned first operation means and the above-mentioned second operation means perform the following operations. Specifically, the above-mentioned first operation means performs the first operation when the value obtained by the above-mentioned computation means is within a first predetermined range (ST423) and does not perform the above-mentioned first operation when the value obtained by the computation means is within a second predetermined range. The above-mentioned second operation means performs the second operation when the value obtained by the above-mentioned computation means is within the second predetermined range (ST425) and does not perform the above-mentioned second operation when the value obtained by the above-mentioned computation means is within the first predetermined range.

When the above-mentioned third threshold value determination means determines that at least one of the above-mentioned change amount in the first direction and the above-mentioned change amount in the second direction exceeds the third threshold value, the above-mentioned first operation means and the above-mentioned second operation means perform the following operations. Specifically, in this case, the above-mentioned first operation means performs the first operation when the above-mentioned first threshold value determination means determines that the change amount in the first direction exceeds the first threshold value. In addition, in this case, the above-mentioned second operation means performs the second operation when the above-mentioned second threshold value determination means determines that the change amount in the second direction exceeds the second threshold value. Here, the third threshold value is set to be greater than or equal to the first threshold value and greater than or equal to the second threshold value.

When it is determined that neither of the above-mentioned change amount in the first direction and the above-mentioned change amount in the second direction exceeds the third threshold value (this is supposed to be a first case), the information processing apparatus having this configuration performs the operation using the value obtained by the above-mentioned computation means. Accordingly, when the user issues an instruction to perform a small movement, the first case results. In the first case, at least one of the first operation and the second operation is executed. The user can perform an input of a movement amount less than or equal to the third threshold value. If the value obtained by the computation means is within the predetermined range, the information processing apparatus comprehends the user's intention that for example, the first operation is desired to be performed and the second operation is desired not to be performed and can correct the operation.

On the other hand, in the information processing apparatus having this configuration, when it is determined that either one of the above-mentioned change amount in the first direction and the above-mentioned change amount in the second direction exceeds the third threshold value (this is supposed to be a second case), it is highly likely that the user has intentionally performed large dragging. In the second case, the information processing apparatus performs switching between the first operation and the second operation based on the first threshold value and the second threshold value. Thus, for example, even when both of the first direction and the second direction are large and the value (for example, a ratio) obtained by the above-mentioned computation means is within the second range, the above-mentioned movement amount in the first direction is not ignored and the first operation in accordance with the movement amount in the first direction is performed, whereby the information processing apparatus can receive an input intended by the user. In addition, in the second case, when the movement amount is less than the second threshold value, the information processing apparatus performs the first operation and does not perform the second operation. Accordingly, the information processing apparatus can reflect the user's intention that for example, the first operation is desired to be performed and the second operation is desired not to be performed.

As described above, since this information processing apparatus performs various processes by using the third threshold value, the information processing apparatus can provide the user with a comfortable operational feeling, whereby the operability of the information processing apparatus is enhanced.

(10) When the change amount in the first direction is greater than or equal to a predetermined value, the first correction value setting means may set the change amount in the first direction as the first correction value, and when the change amount in the first direction is less than the predetermined value, the first correction value setting means may set the first correction value to be 0.

When the change amount in the second direction is greater than or equal to a predetermined value, the second correction value setting means may set the change amount in the second direction as the second correction value, and when the change amount in the second direction is less than the predetermined value, the second correction value setting means my set the second correction value to be 0.

This configuration allows a reduction of any operation which is not intended by the user.

(11) The above-mentioned information processing program may further cause the computer in the above-mentioned information processing apparatus to function as computation means for computing the above-mentioned change amount in the first direction and the above-mentioned change amount in the second direction.

In this case, when a value obtained by the above-mentioned computation means is within a first predetermined range (Yes at ST422), the above-mentioned first correction value setting means sets the above-mentioned change amount in the first direction as the above-mentioned first correction value (ST423) and the above-mentioned second correction value setting means sets the above-mentioned second correction value to be 0 (ST4230).

In this case, when the value obtained by the above-mentioned computation means is within a second predetermined range (Yes at ST424), the above-mentioned first correction value setting means sets the above-mentioned change amount in the first direction to be 0 (ST4250) and the above-mentioned second correction value setting means sets the above-mentioned change amount in the second direction as the above-mentioned second correction value (ST425).

In this case, when the value obtained by the above-mentioned computation means is within a third predetermined range (Yes at ST426), the above-mentioned first correction value setting means may set the above-mentioned change amount in the first direction as the above-mentioned first correction value (ST427) and the above-mentioned second correction value setting means may set the above-mentioned change amount in the second direction as the above-mentioned second correction value (ST428).

Here, the hand jiggling naturally easily occurs, and it is extremely difficult for the user to input only the first change amount. In this respect, when the value obtained by the above-mentioned computation means is within the first predetermined range, even if there is a second change amount, the information processing apparatus having this configuration corrects the second change amount to be 0. In addition, when the value obtained by the above-mentioned computation means is within the second predetermined range, even if there is a first change amount, this information processing apparatus corrects the first change amount to be 0.

As described above, when each of the values obtained by computing the change amount in the first direction and the change amount in the second direction is within the first predetermined range or the second predetermined range, the information processing apparatus having this configuration corrects one of the change amount in the first direction and the change amount in the second direction to be 0. For example, the information processing apparatus comprehends the user's intention that the first operation is desired to be performed and the second operation is desired not to be performed and can correct the change amount. In addition, when the value obtained by the above-mentioned computation is within the third range, the above-mentioned first correction value setting means sets the above-mentioned change amount in the first direction as the first correction value and the above-mentioned second correction value setting means sets the above-mentioned change amount in the second direction as the second correction value. Accordingly, the information processing apparatus does not perform a stereotyped operation, in which only either one of the operations is performed as conventionally, and can perform both of the first operation and the second operation depending on the user's instruction, thereby allowing a reduction of any operation which is not intended by the user.

(12) In the present embodiment,
an information processing apparatus (game apparatus 10) having a pointing device (touch panel 15, stick 16) may include: second change amount calculation means; first operation means; and second operation means.

The above-mentioned coordinate detection means (ST1, ST21, ST22, ST23) detects coordinates pointed to by the above-mentioned pointing device.

The above-mentioned first change amount calculation means (ST24) calculates a change amount (X component movement amount diffX) of the above-mentioned coordinates, in a first direction, which is obtained when inputting is continuously performed by the pointing device.

The above-mentioned second change amount calculation means (ST25) calculates a change amount (Y component movement amount diffY) of the above-mentioned coordinates, in a second direction, which is obtained when inputting is continuously performed by the pointing device.

The first operation means (ST4, ST401) performs a first operation based on the above-mentioned change amount, in the first direction, the change amount calculated by the above-mentioned first change amount calculation means.

The second operation means (ST4, ST402) performs, based on the above-mentioned change amount in the second direction, a second operation different from the above-mentioned first operation, the change amount calculated by the above-mentioned second change amount calculation means.

According to the present embodiment, operability of the information processing apparatus can be enhanced.

These and other features, aspects and advantages of the present embodiment will become more apparent from the following detailed description of the present embodiment when taken in conjunction with the accompanying drawings.

BRIEF DESCRIPTION OF THE DRAWINGS

FIG. 3 shows an outline of a flow of a touch processing program according to a first embodiment;

FIG. 7 shows an example of detection processing according to the first embodiment;

FIG. 13 shows an example 5 of the correction processing and the image formation processing according to the first embodiment.

DESCRIPTION OF THE PREFERRED EMBODIMENTS

Hereinafter, with reference to the drawings, a game apparatus according to a first embodiment of the present invention will be described.

Figure 1:
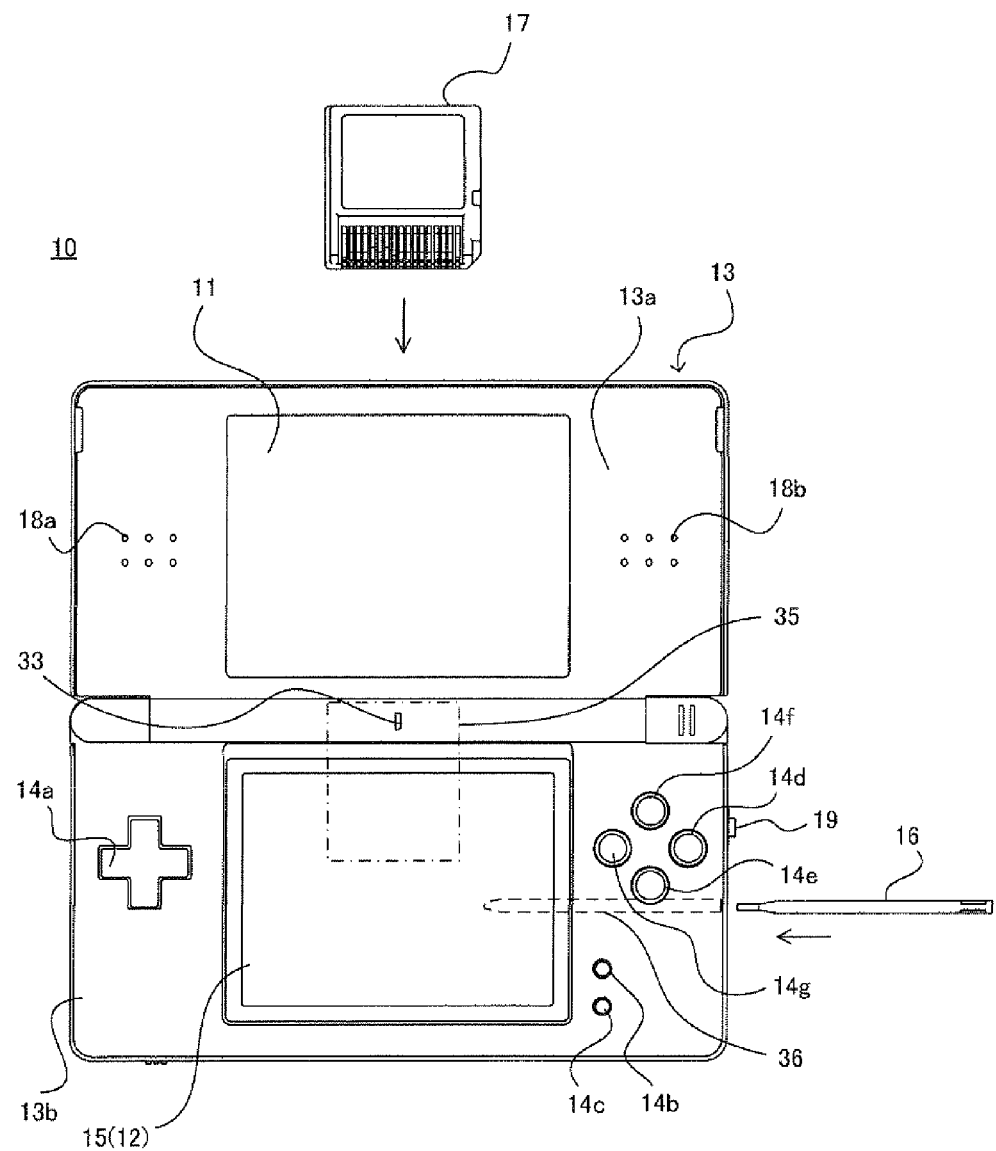
FIG. 1 is a diagram illustrating an external view of a game apparatus 10 according to one embodiment.

FIG. 1 is a diagram illustrating an external view of a game apparatus according to one embodiment. The present embodiment is applicable to not only a handheld game apparatus but also a stationary game apparatus. Further, the present embodiment is applicable to not only a game apparatus but also any information processing apparatus having a video content displaying function (for example, a personal computer, a mobile phone, a television receiver, a DVD player, etc.).

In FIG. 1, the game apparatus 10 includes a first LCD (Liquid Crystal Display) 11 and a second LCD 12. A housing 13 comprises an upper housing 13*a* and a lower housing 13*b*, and the first LCD 11 is accommodated in the upper housing 13*a*, and the second LCD 12 is accommodated in the lower housing 13*b*. Resolutions of the first LCD 11 and the second LCD 12 are both 256 dots×192 dots. Note that though an LCD is used as a display device in the present embodiment, any other display devices such as a display device using an EL (Electro Luminescence) may be used. Also, the resolution of the display device may be at any level.

The upper housing 13a is provided with sound holes 18a and 18b for outputting a sound from a pair of loudspeakers (30a and 30b shown in FIG. 2) to an exterior. A description of the pair of loudspeakers will be provided later. A hole 33 for a microphone is provided at a hinge portion which connects the upper and lower housings 13a and 13b in a pivotable manner.

The lower housing 13b is provided with input devices as follows; a cross switch 14a, a start switch 14b, a select switch 14c, an "A" button 14d, a "B" button 14e, an "X" button 14f, and a "Y" button 14g. On a side face of the lower housing 13b, an L button and an R button (not shown) are provided. In addition, a touch panel 15 is provided on a screen of the second LCD 12 as another input device. On the side face of the lower housing 13b, an insertion slot 35 (indicated by an alternate long and short dashed line in FIG. 1) for connecting a power switch 19 and a memory card 17 and an insertion slot 36 (indicated by a dotted line in FIG. 1) for accommodating a stick 16 are provided.

The touch panel 15 may be any one of, for example, a resistive film type, an optical type (infrared type), and a capacitive coupling type. The touch panel 15 can be operated by not only the stick 16 but also a finger. The touch panel 15 used in the present embodiment has a same resolution at 256 dots×192 dots (detection accuracy) as that of the second LCD 12. However, it is not necessarily required that the resolutions of the touch panel 15 and the second LCD 12 are the same as each other.

The memory card 17 includes a ROM 17a for storing a game program and a RAM 17b for storing backup data in a rewritable manner. The memory card 17 is attached into the insertion slot 35 provided in the lower housing 13b in a removable manner. Though not shown in FIG. 1, in a depth end of the insertion slot 35 is provided a first connector 23 (see FIG. 2) for connecting with a connector provided at an end portion of the memory card 17. When the memory card 17 is inserted into the insertion slot 35, the connectors are mutually connected, allowing a CPU core 21 (see FIG. 2) of the game apparatus 10 to access the memory card 17.

Figure 2:
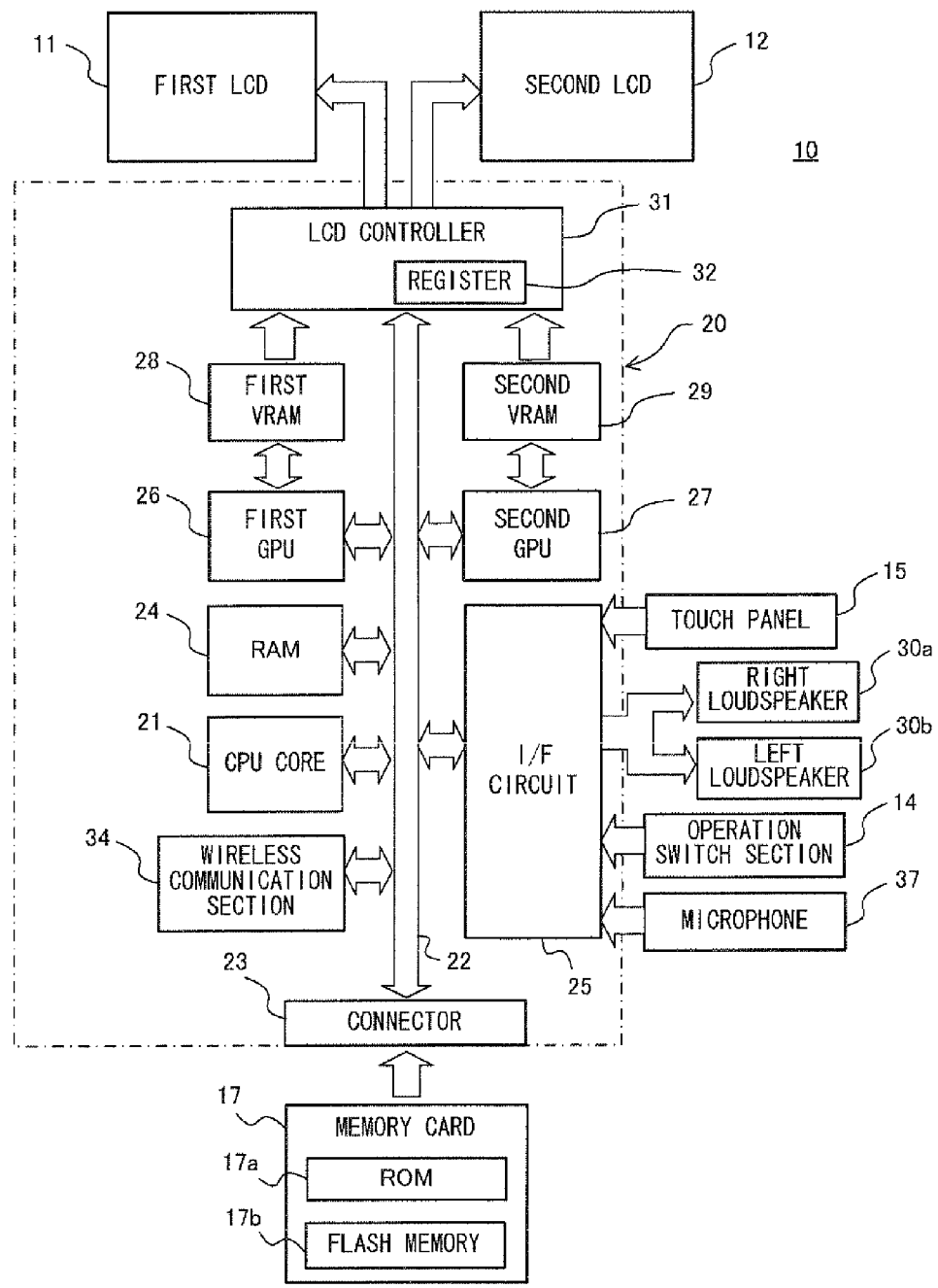
FIG. 2 is a diagram illustrating an internal structure of the game apparatus 10.

Next, with reference to FIG. 2, an internal configuration of the game apparatus 10 will be described. FIG. 2 is a block diagram illustrating the internal configuration of the game apparatus 10. In FIG. 2, the CPU core 21 is mounted on an electronic circuit board 20 which is housed in the housing 13. Via a bus 22, the CPU core 21 is connected to a connector 23, an input/output interface circuit (shown as an I/F circuit in the diagram) 25, a first GPU (Graphics Processing Unit) 26, a second GPU 27, a RAM 24, an LCD controller 31 and a wireless communication section 34. The memory card 17 is connected to the connector 23 in a removable manner. Connected to the I/F circuit 25 are the touch panel 15, a right loudspeaker 30a, a left loudspeaker 30b, and an operation switch section 14, which includes the cross switch 14a, the "A" button 14d, and others, as shown in FIG. 1. The right loudspeaker 30a and the left loudspeaker 30b are arranged inside the sound holes 18a and 18b, respectively. The microphone 37 is arranged inside the hole 33 for the microphone.

A first VRAM (Video RAM) 28 is connected to the first GPU 26, and a second VRAM 29 is connected to the second GPU 27. In accordance with an instruction from the CPU core 21, the first GPU 26 generates a first display image and writes the first display image into the first VRAM 28. The second GPU 27 also follows an instruction from the CPU core 21 to generate a second display image and writes the display image into the second VRAM 29. The first VRAM 28 and the second VRAM 29 are connected to the LCD controller 31.

The LCD controller 31 includes a register 32. The register 32 stores a value of either 0 or 1 in accordance with an instruction from the CPU core 21. When the value of the register 32 is 0, the LCD controller 31 outputs to the first LCD 11 the first display image which has been written into the first VRAM 28 and outputs to the second LCD 12 the second display image which has been written into the second VRAM 29. When the value of the register 32 is 1, the first display image which has been written into the first VRAM 28 is outputted to the LCD 12 and the second display image which has been written into the second VRAM 29 is outputted to the first LCD 11.

The wireless communication section 34 has a function of receiving and transmitting data to and from a wireless communication section of other game apparatus. The game apparatus 10 can be connected via the wireless communication section 34 to a wide area network such as the Internet and can perform, via the network, communications with other game apparatus.

In the present embodiment, the CPU core 21 of the game apparatus 10 executes a touch processing program loaded from the ROM 17a or the like of the memory card 17 to the RAM 24. Hereinafter, with reference to FIG. 3 through FIG. 12, operations of the game apparatus 10 based on the touch processing program will be described.

FIG. 3 shows an outline of a flow of the touch processing program. Here, in FIG. 3, "ST" indicates a step number. By using the touch processing program (refer to 241 in FIG. 6), the CPU core 21 mainly executes ST1: a touch input process, ST2: a movement direction detection process, ST3: a correction process, and ST4: an image formation process. Note that in the touch processing program, these four steps ST1 through ST4 are not exactly separated completely. In some cases, these steps ST1 through ST4 are mutually related as described later and processes at the subsequent steps may vary depending on the processes at the preceding steps and conditional judgment.

The processes at ST1 through ST4 are repeatedly executed by the CPU core 21 in synchronization with a frame period of each image frame.

At ST1, the CPU core 21 determines whether the touch panel 15 has been touched by the stick 16. In addition, the CPU core 21 inputs coordinates of a position touched on the touch panel 15.

At ST2, the CPU core 21 determines whether as a result of the above-mentioned touching operation, the touch panel is being continuously touched for a period of two or more frames and detects movement amounts in a horizontal direction and a vertical direction (these are referred to as an X component movement amount diffX and a Y component movement amount diffY). Here, a moving direction may be detected.

At ST3, the CPU core 21 performs correction processing as to the movement amounts detected at ST2. Here, in consideration of jiggling of a hand with which dragging is performed on the touch panel 15, the CPU core 21 performs the correction processing so as to further enable an operation intended by a user. As examples of the above-mentioned correction processing, (A) in a case where the user drags the stick 16 substantially in a vertical direction or a horizontal direction, the CPU core 21 can correct the movement amounts inputted at ST2 to be a movement amount of only a horizontal direction component or a vertical direction component; and (B) in a case where the movement amounts are small, the CPU core 21 can correct the movement amounts to be "0".

At ST4, based on the movement amounts corrected at ST3, the CPU core 21 causes the second GPU 27 to perform image processing. In the present embodiment, based on values of the corrected vertical and horizontal movement amounts, the processing is individually performed. The CPU core 21 performs such individual processing, thereby allowing enhancement of entertainment performance and operability. Details of the processing will be described later.

Though it is not mentioned in the description at ST2, strictly speaking, upon the detection of the initial touching in the flow shown in FIG. 3, the CPU core 21 once finishes the flow. Thereafter, the CPU core 21 detects amounts (=the above-mentioned movement amounts) changed from coordinates detected in a second and subsequent flows. The correction processing is not necessarily performed by using a mathematical expression but may be performed based on some condition. In a case where based on a condition of small movement amounts (the above-mentioned (B)), the CPU core 21 controls characters or the like so as not to move, it is supposed that the processing is included in the correction processing (ST3).

With reference to FIG. 4 and FIG. 5, a specific example of the processing of the touch processing program shown in FIG. 2 will be described. FIG. 4A shows a display example of the second LCD 12. In FIG. 4B, FIG. 4D, and FIG. 5, a processing example of a touch processing program 241 in which a display state shown in FIG. 4A is an initial state is represented.

Figure 4A:
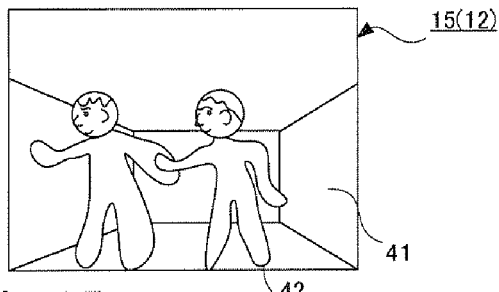
FIG. 4A through FIG. 4D show a processing example of the touch processing program according to the first embodiment.

As shown in FIG. 4A, a scene in which dancers 42 are dancing in a dance hall 41 is displayed on the second LCD 12. The second LCD 12 is provided with the touch panel 15 as mentioned above. When dragging is performed by using the stick 16, the touch panel 15 detects coordinates in a real-time manner and outputs a touching state to the CPU core 21. The CPU core 21 determines such a touching state for each of the frames and detects movement amounts.

Figure 4B:
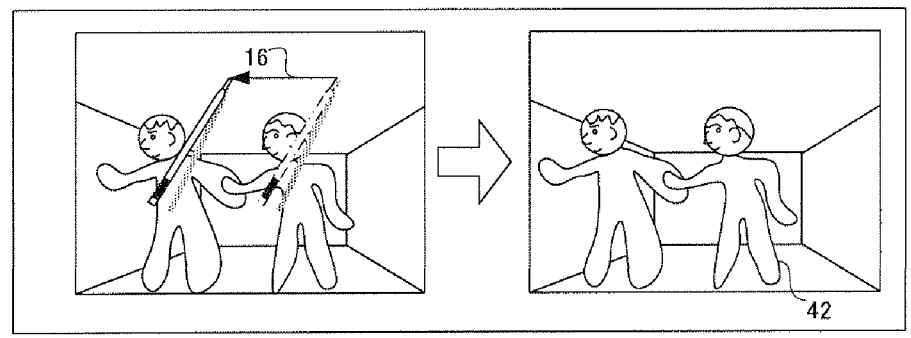

In an example of FIG. 4B, a case where the user moves the stick 16 in a left direction on the touch panel 15 is shown (a left diagram of FIG. 4B). In this case, a screen of FIG. 4A scrolls to the left in the second LCD 12 (a right diagram of FIG. 4B).

Note that in the present embodiment, moving (with the stick 16 contacting the touch panel 15) of the stick 16 on the touch panel 15, caused by the user, is referred to as dragging. A superordinate concept of dragging is inputting of coordinates of a trajectory by the user with the pointing device. In order to discriminate between dragging and simple moving of coordinates pointed to by the pointing device, the game apparatus 10 may request the user to perform an operation while pressing some button.

Figure 4C:
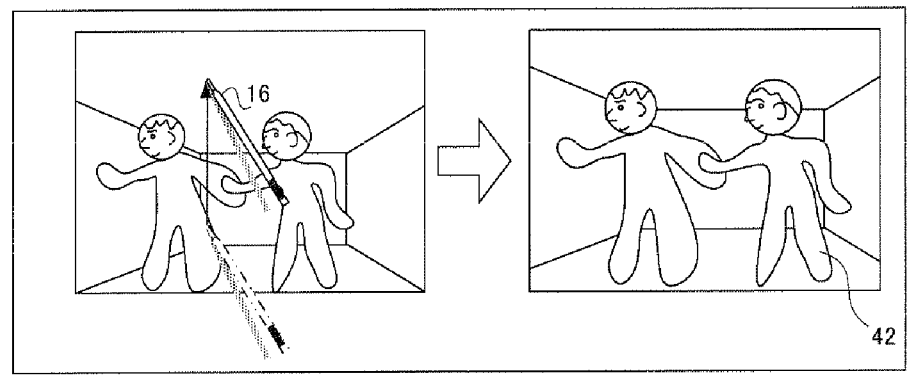

In an example of FIG. 4C, a case where the user moves the stick 16 in an upward direction on the touch panel 15 is shown (a left diagram of FIG. 4C). In this case, a screen is displayed with a viewpoint close to the dancers 42 (a right diagram of FIG. 4C). Accordingly, the dance hall 41 and the dancers 42 are displayed in a zoomed-in manner.

Figure 4D:
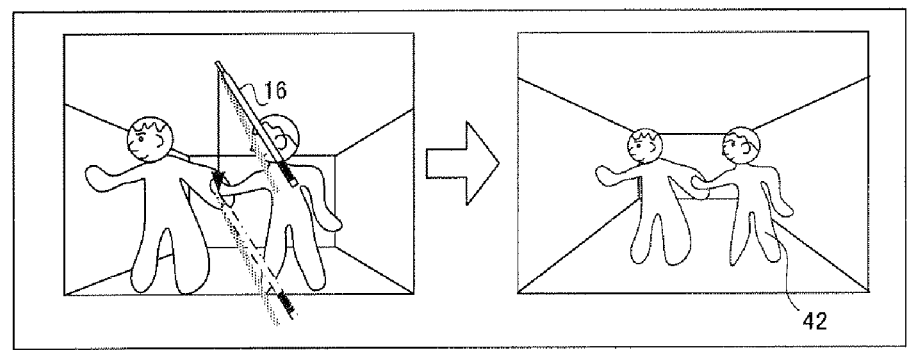

In an example of FIG. 4D, a case where the user moves the stick 16 in a downward direction on the touch panel 15 is shown (a left diagram of FIG. 4D). In this case, a screen of the second LCD 12 is displayed with a viewpoint away from the dancers 42 (a right diagram of FIG. 4D). Accordingly, the dance hall 41 and dancers 42 are displayed in a zoomed-out manner.

Thought not shown, in a case where the user moves the stick 16 in a horizontal right direction on the touch panel 15, a screen of FIG. 4A is scrolled further to the right. Accordingly, the dancers 42 are displayed in a position further rightward from a current position shown in FIG. 4A.

Figure 5A:
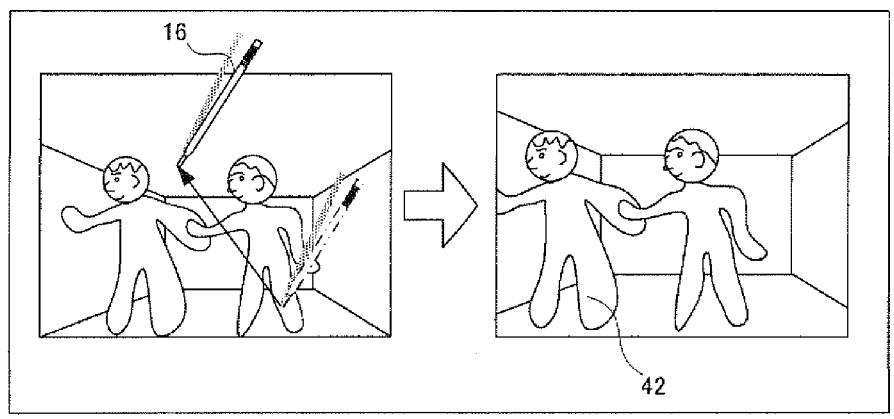
FIG. 5A through FIG. 5C show the processing example of the touch processing program according to the first embodiment.

In an example of FIG. 5A, a case where the user moves the stick 16 in an obliquely left upward direction on the touch panel 15 is shown (a left diagram of FIG. 5A). In this case, a screen of second LCD 12 is displayed with the viewpoint close to the dancers 42 and concurrently scrolled to the left (with the dancers 42 displayed in a position further leftward) (a right diagram of FIG. 5A).

Figure 5B:
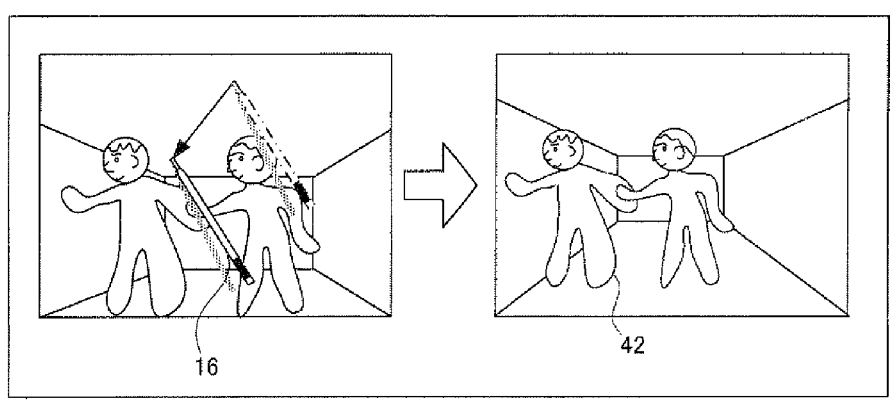

In an example of FIG. 5B, the user moves the stick 16 in an obliquely left downward direction on the touch panel 15 is shown (a left diagram of FIG. 5B). In this case, a screen of the second LCD 12 is displayed with a viewpoint away from the dancers 42 and concurrently scrolled to the left (with the dancers 42 displayed in a position further leftward) (a right diagram of FIG. 5B).

Figure 5C:
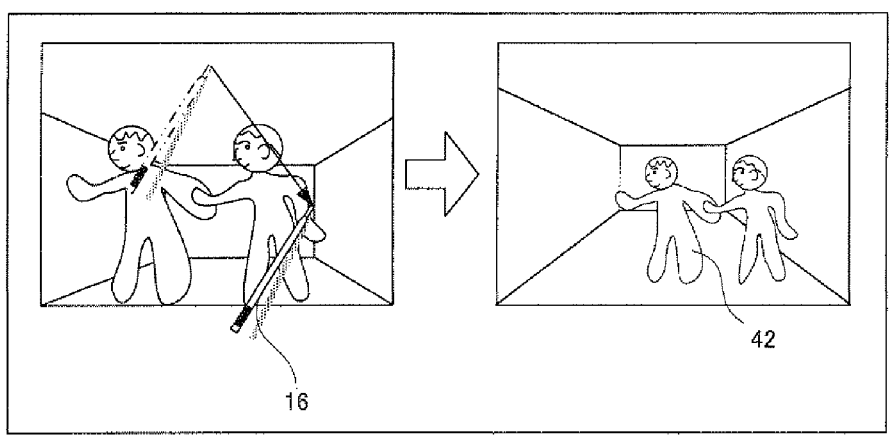

In an example of FIG. 5C, a case where the user moves the stick 16 in an obliquely right downward direction on the touch panel 15 is shown (a left diagram of FIG. 5C) In this case, a screen of the second LCD 12 is displayed with a viewpoint away from the dancers 42 and concurrently scrolled to the right (with the dancers 42 displayed in a position further rightward) (a right diagram of FIG. 5C).

As described above, in the present embodiment, the CPU core 21 detects the vertical direction component and the horizontal direction component of the movement amounts obtained by the above-mentioned dragging operation on the touch panel 15 (ST1, ST2) and performs the image formation processing (ST4). At ST4, in the CPU core 21, change amounts of the coordinates in the vertical direction and the horizontal direction are assigned as pointing inputs for respectively different operations. In the examples of FIG. 4 and FIG. 5, one of the processing is the left and right scrolling and the other is the moving of the viewpoint in the close and away-from manner. In this way, the game apparatus 10 of the present embodiment is operable to specify the respectively different operations while using the stick 16 as one pointing means.

Figure 6:
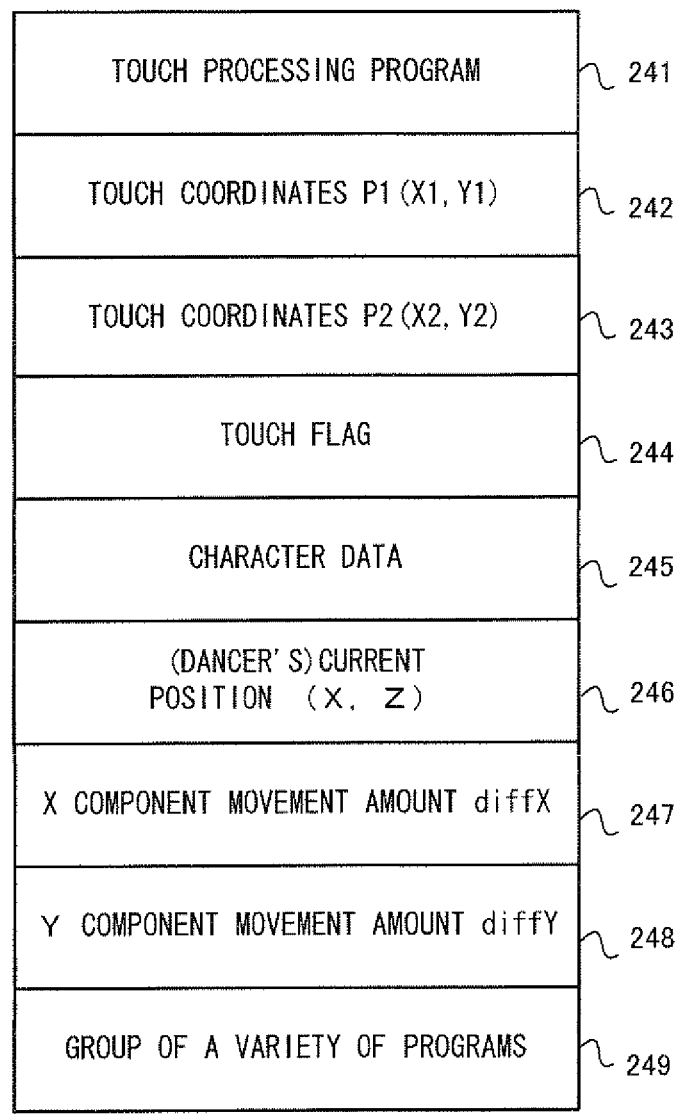
FIG. 6 shows an example of programs and data stored in a RAM according to the first embodiment.

Next, with reference to FIG. 6, examples of programs and data stored n the RAM 24 in order for the CPU core 21 to execute the touch processing program will be described. The RAM 24 has stored therein a touch processing program 241, touch coordinates 242, touch coordinates 243, a touch flag 244, character data 245, a current position 246, the X component movement amount diffX 247, the Y component movement amount diffY 248, and a group 249 of a variety of programs. The touch processing program 241 corresponds to the touch processing program described with reference to FIG. 3. The touch coordinates 242 (P1 (X1, Y1)) and the touch coordinates 243 (P2 (X2, Y2)) are positions at which the touch panel 15 detects the stick 16. In the data of the touch coordinates 242, latest touch coordinates are stored and in the data of the touch coordinates 243, touch coordinates in a period of a preceding frame are stored.

The touch flag 244 is used for determining whether the touching operation is being performed in the period of the preceding frame. By using this flag, the CPU core 21 can determine whether or not the touching operation (hereinafter, which means that the stick 16 is in contact with the touch panel 15) is being continued. Here, that the touch operation is being continued corresponds to that the above-mentioned dragging operation is being performed.

In the character data 245, shaped of the dancers 42 or the like are stored. In the current position 246, current positions (horizontal direction X, depth direction Z) of the dancers 42 are stored. The X component movement amount diffX 247 and the Y component movement amount diffY 248 represent movement amounts shifted from the coordinates in the period of the preceding frame (hereinafter, these are referred to simply as an X component movement amount diffX and a Y component movement amount diffY). In addition, the RAM 24 has stored therein the group 249 of the variety of programs.

Next, with reference to a flowchart in FIG. 7, a specific example of detection processing (ST10) in FIG. 3 will be described. As described above, ST10 in FIG. 3 includes ST1 and ST2. ST11 through ST15 are mainly pertinent to ST1, and ST21 through ST23 are mainly pertinent to ST2.

At ST11, the CPU core 21 determines whether the touching operation has been performed. In a case where the touching operation has not been performed (No at ST11), the CPU core 21 sets the touch flag 244 to be off. Further, the CPU core 21 abandons the touch coordinates 242 and 243 (values of P1 and P2), thereafter finishing the flow.

At ST11, in a case where the touching operation has been performed during a period of a current frame (Yes at ST1), the CPU core 21 proceeds to ST12.

At ST12, the CPU core 21 determines whether or not the touch flag 244 is on. At ST12, when the touch flag 244 is off (No at ST12), the CPU core 21 sets the touch flag 244 to be on (ST13) and stores current touch coordinates in the touch coordinates 242 (P1) (ST21). At ST21, the RAM 24 can store by using the touch flag 244 that the touching operation is started. Thereafter, the flow is finished.

At ST12, when the touch flag 244 is on (Yes at ST12), the CPU core 21 proceeds to ST22. Here, in a loop of FIG. 7, before the determination at ST12 is conducted, there is no step at which the touch flag 244 is set. Accordingly, a state where the touch flag 244 is on indicates a state where the touching operation has been performed in a period of a preceding frame. Further, ST12 branches in a case where the touching operation has been performed in a current flow (Yes at T11). Accordingly, Yes at ST12 indicates that the touching operation has been continued from a period of a preceding frame.

At ST22, the CPU core 21 substitutes P1 in touch coordinates P2 (X2, Y2) 243. The P1 substituted here is the touch coordinates stored in the flow shown in FIG. 7.

At ST23, the CPU core 21 stores current touch coordinates in the touch coordinates P1 (X1, Y1) 242. At this ST23, the past-inputted coordinates and the current coordinates are inputted, whereby the CPU core 21 can calculate movement amounts obtained by dragging with the stick 16.

At ST24, the CPU core 21 stores an X coordinate change amount of X1-X2 as diffX. At ST25, the CPU core 21 stores an Y coordinate change amount of Y1-Y2 as diffY. Note that ST25 and ST24 may be concurrently performed or one thereof may be first performed and thereafter, the other may be performed.

Thereafter, the CPU core 21 performs the processing at ST3 and the processing at ST4 shown in FIG. 3.

In the flow of FIG. 7, the X component movement amount diffX and the Y component movement amount diffY are obtained with respect to a period of each one frame. In this flow, since the X component movement amount diffX and the Y component movement amount diffY represent movement amounts per unit time, these movement amounts are regarded as moving velocities. In addition, flows 101 and 102 in FIG. 7 are cited in and after the description with reference to FIG. 8.

Next, with reference to FIG. 8 through FIG. 11, examples 1 through 4 of the ST3: correction processing and ST4: image formation processing shown in FIG. 3 will be described. In each of the below-described examples 1 through 4, the ST10 shown in FIG. 7 is cited as already defined processing and the flows 101 and 102 in the drawings are the same as those in FIG. 7.

Example 1

Figure 8A:
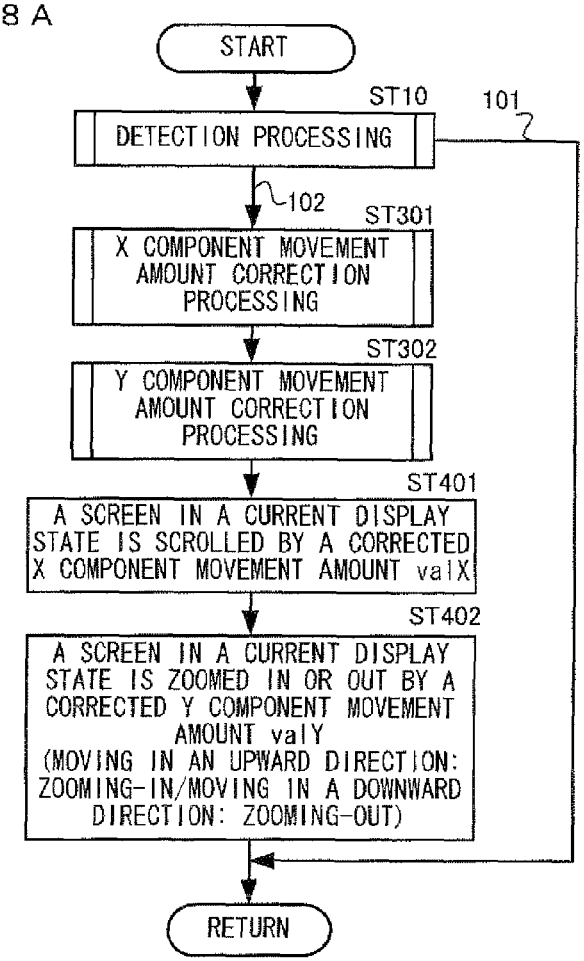
FIG. 8A through FIG. 8C show an example 1 of correction processing and image formation processing according to the first embodiment.
Figure 8B:
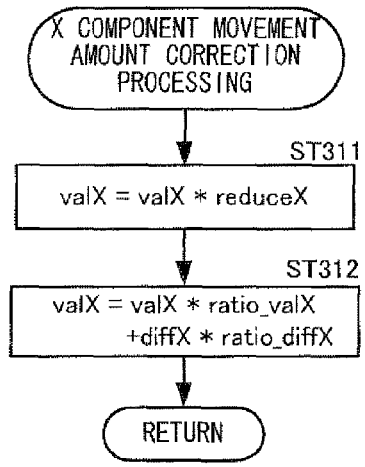
Figure 8C:
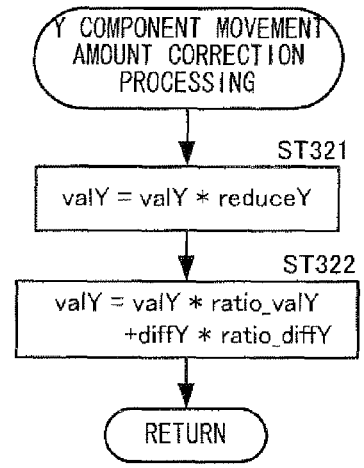

With reference to flows shown in FIG. 8, an example 1 of ST3 and ST4 is shown. Here, in FIG. 8A, a main flow of the touch processing program 241, which includes ST10, is shown. In FIG. 8B and FIG. 8C, sub-flows of FIG. 8A are shown. In addition, processing at ST3 is pertinent to ST301 and ST302. Processing at ST4 is pertinent to ST401 and ST402.

At ST301, the CPU core 21 performs correction processing of an X component movement amount diffX. After ST301, the CPU core 21 proceeds to ST302.

At ST302, the CPU core 21 performs correction processing of a Y component movement amount diffY. After ST302, the CPU core 21 proceeds to ST401.

At ST401, the CPU core 21 performs scrolling with respect to a corrected X component movement amount valX from a current display state. After ST401, the CPU core 21 proceeds to ST402 (see FIG. 4 and FIG. 5).

At ST402, the CPU core 21 performs zooming-in or zooming-out (moving in an upward direction: zooming-in/moving in a downward direction: zooming-out) with respect to a corrected Y component movement amount valY from a current display state (see FIG. 4 and FIG. 5) After ST402, the flow of FIG. 8 is finished.

In FIG. 8B, correction processing of the X component movement amount valX at ST301 is shown. The flow of FIG. 8 is processed one time per frame period of the second LCD 12. Here, an X component movement amount valX obtained when the CPU core 21 repeats the processing shown in FIG. 8 T times from a frame period (for example, when the image shown in FIG. 4A is displayed) is supposed to be an X component movement amount valX (T) with a suffix (T) appended. An X component movement amount calculated for the (T−1)th time immediately before the Tth time is supposed to be an X component movement amount valX(T−1). Similarly, an X component movement amount diffX obtained when the processing shown in FIG. 8 is repeated T times as mentioned above is supposed to be an X component movement amount diffX (T).

At ST311 and ST312, calculations are performed by using the following equation (1) and equation (2).

$$valX0(T) = valX(T-1) * reduceX \qquad \text{(Equation 1)}$$

$$valX(T) = valX0(T) * \text{ratio\_valX} + \\ diffX(T) * \text{ratio\_diffX} + diffX(T) * \text{ratio\_diffX} \qquad \text{(Equation 2)}$$

Here, a sign "*" represents a multiplication (hereinafter similarly represented); "reduceX", "ratio_valX", and "ratio_diffX" are predetermined constants; "reduceX" can be a numerical value from 0 to 1, for example, 0.9; "ratio_valX" can be, for example, 0.9; "ratio_diffX" can be, for example, 0.1; and "valX0(T)" is a calculation value used to calculate new "valX(T)".

At ST311 and ST312, "valX(T)" of a current frame period (corresponding to "this time" in the present invention) can be calculated.

In FIG. 8C, correction processing of a Y component movement amount valY at ST302 is shown.

$$valY0(T) = valY(T-1) * reduceY \quad \text{(Equation 3)}$$

$$valY(T) = valY0(T) * \text{ratio\_valY} + diffY(T) * \text{ratio\_diffY} \quad \text{(Equation 4)}$$

This processing is similar to the above-described processing shown in FIG. 8B. The description of the processing shown in FIG. 8B is applied mutatis mutandis to a description of the processing shown in FIG. 8C, by changing a character "X" to a character "Y".

Here, an effect of the correction at ST311, ST312, ST321, and ST322 will be described. By performing the above-mentioned correction, when a user moves the stick 16 in a horizontal direction at a constant velocity, a screen of the second LCD 12 is initially scrolled in a slow manner and thereafter, is scrolled at a velocity which gradually approximates to be a constant velocity. In other words, immediately after the user starts to move the stick 16, the values X component movement amount diffX 247" and "Y component movement amount diffY 248" are corrected so as to be small. When the processing is performed in such a manner, if a tip of the stick 16 only slightly touches the touch panel 15, a screen does not change so much. In other words, unless the user continues to move the stick 16 in a given direction, the image does not greatly change. Thus, a sensitive reaction of the image to a user's erroneous operation (or hand jiggling) can be avoided and an influence of the erroneous operation with the stick 16 can be minimized.

Example 2

Figure 9:
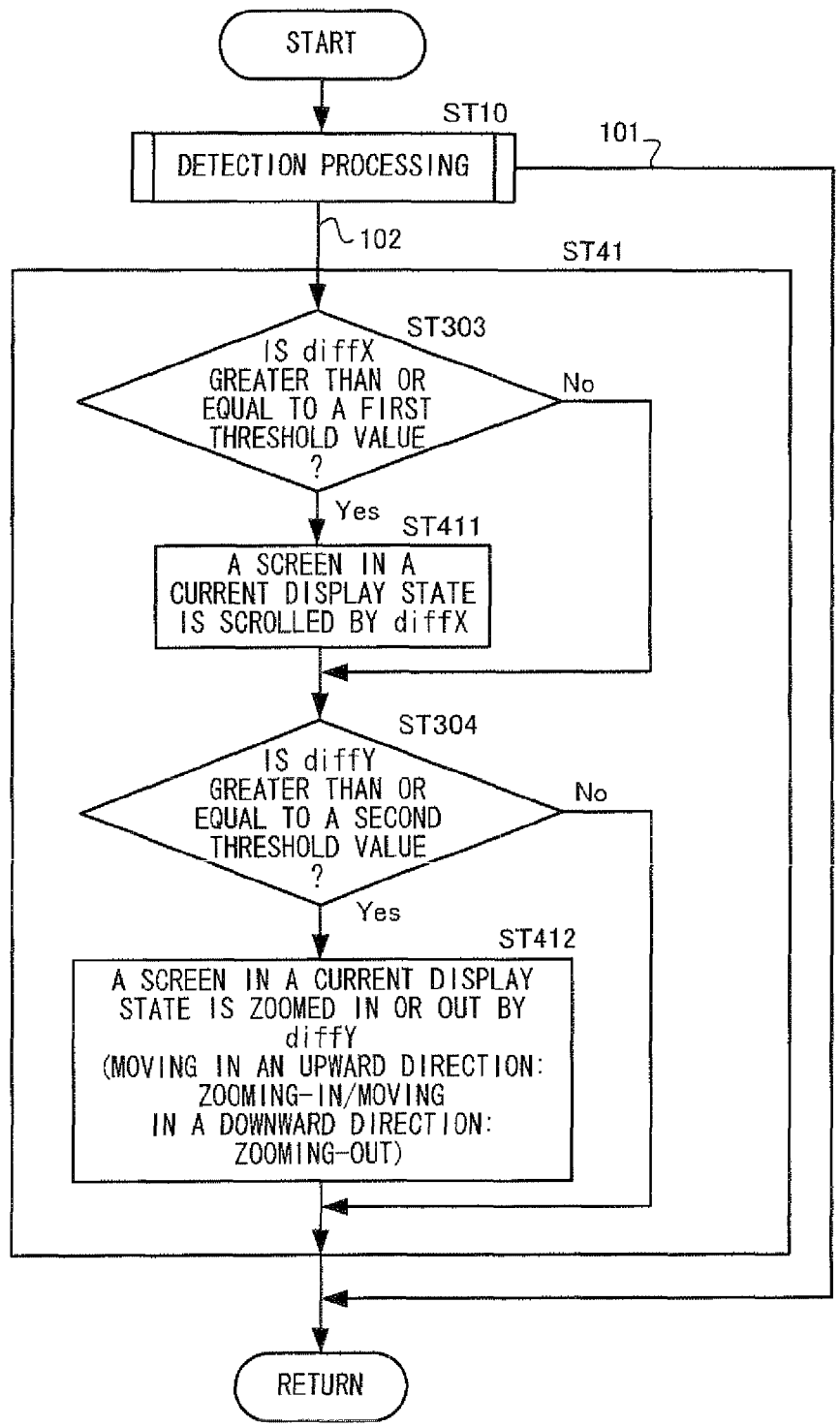
FIG. 9 shows an example 2 of the correction processing and the image formation processing according to the first embodiment.

In FIG. 9, an example 2 of ST3 and ST4 shown in FIG. 3 is shown. In this example, ST3 corresponds to ST303 and ST304; and ST4 corresponds to ST411 and ST412. ST411 and ST412 correspond to ST401 and ST402 in the example 1.

In this example 2, the CPU core 21 compares an X component movement amount diffX and a Y component movement amount diffY with a predetermined first threshold value and a predetermined second threshold value. When the X component movement amount diffX is less than the first threshold value (No at ST303), processing at ST411 is not performed with respect to that frame period. When the Y component movement amount diffY is less than the second threshold value (No at ST304), processing at ST412 is not performed with respect to that frame period. Accordingly, if a tip of the stick 16 only slightly touches the touch panel 15, a screen does not change. Thus, by performing the processing in this flow, an influence of an erroneous operation with the stick 16 can be minimized and operability of the game apparatus 10 can be enhanced. Hereinafter, the flow in FIG. 9 will be described in detail.

When the CPU core 21 branches from ST10, at which detection processing is performed, to a flow 102, movement amounts diffX and diffY have already been calculated.

When the X component movement amount diffX 247 is greater than or equal to the first threshold value (Yes at ST303), the CPU core 21 performs processing at ST411. When the Y component movement amount diffY 248 is greater than or equal to the second threshold value (Yes at ST304), the CPU core 21 performs processing at ST412.

At ST411, as shown in FIG. 4 and FIG. 5, the CPU core 21 scrolls a whole screen of the second LCD 12 in a current display state shown in FIG. 4A to the left or the right. A moving direction (left or right) of dancers 42 is the same as a left or right moving direction of the stick 16. A movement amount is the X component movement amount diffX 247. Next to the processing at ST411, the CPU core 21 performs processing at ST304.

At ST412, as shown in FIG. 4 and FIG. 5, the CPU core 21 zooms in or zooms out the dancers 42 on the second LCD 12 in a current display state shown in FIG. 4A. The CPU core 2 increments by diffY a value of a current position 246 in a depth direction Z to update the current position 246. Based on a viewpoint of the newly calculated current position 246, the CPU core 21 determines sizes of the dancers 42.

In the example 2, a case where the X component movement amount diffX or the Y component movement amount diffY is less than the threshold value corresponds to a case where the movement amount is corrected to be 0. In the example 2, although the correction is not performed by using calculation formulae, since the processing which corresponds to the correction of the movement amount based on a conditional judgment is performed, this also corresponds to the correction processing (ST3).

Here, the above described ST303, ST411, ST304, and ST412 are collectively defined as ST41.

Example 3

Figure 10:
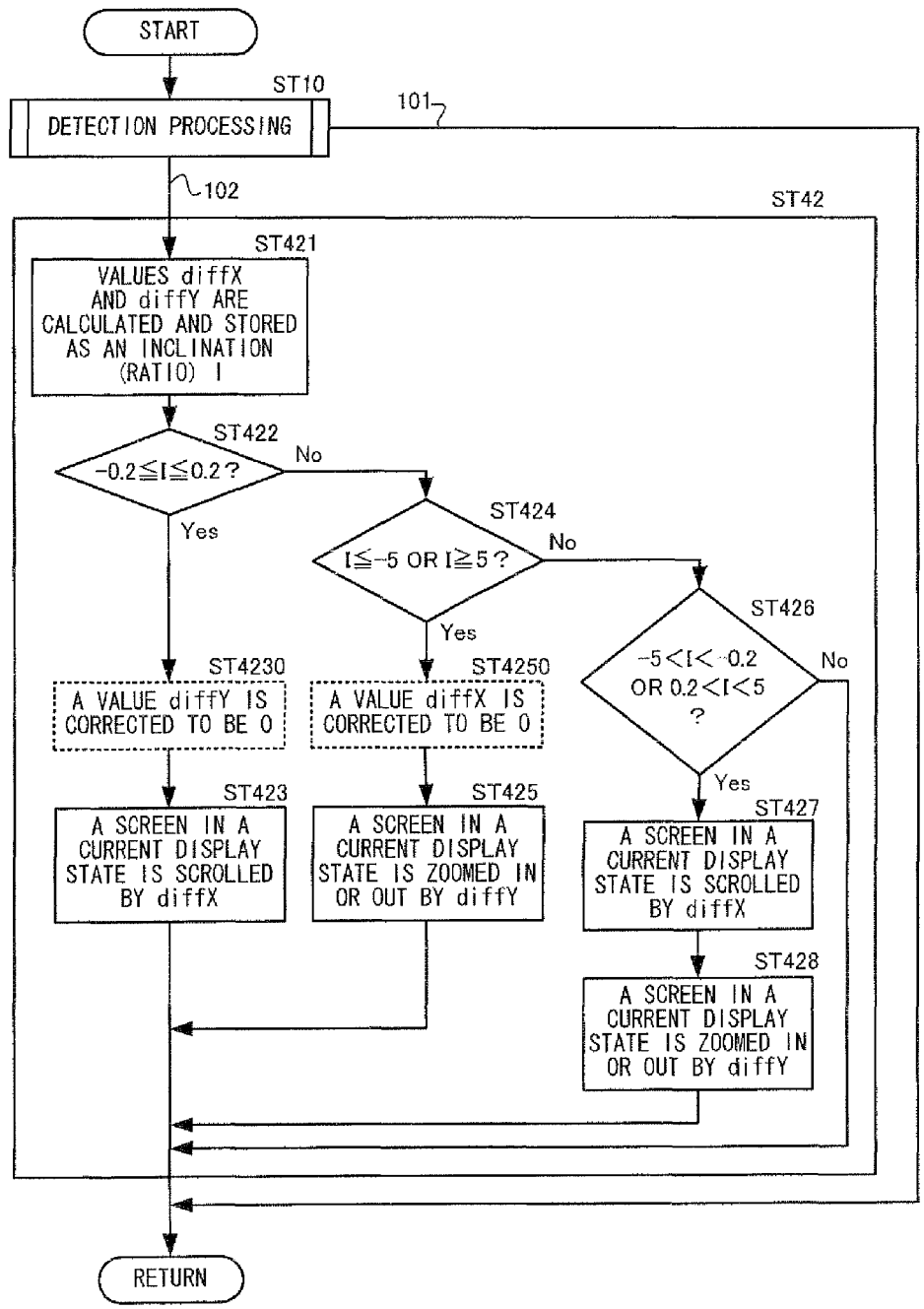
FIG. 10 shows an example 3 of the correction processing and the image formation processing according to the first embodiment.

In FIG. 10, an example 3 of ST3 and ST4 shown in FIG. 3 is shown. Of steps in the example 3, processing at ST422, ST4230, ST424, and ST4250 substantially correspond to the correction processing (ST3).

When the CPU core 21 branches from ST10, at which the detection processing is performed, to a flow 102, movement amounts diffX and diffY have already been calculated.

At ST421, the CPU core 21 calculates a ratio diffY/diffX of movement amounts. Here, in the below description, an inclination I (i.e., a ratio of the movement amounts) of a moving direction of the stick 16 is defined as diffY/diffX. The CPU core 21 causes the RAM 24 to store the inclination T.

At and after ST422, the CPU core 21 changes processing in accordance with a value of the inclination I=diffY/diffX. Specifically, by comparing the inclination I with a predetermined threshold value (=±0.2, ±5), the CPU core 21 determines whether the stick 16 is dragged on the touch panel 15 in a substantially X-axis direction (Yes at ST422); whether the stick 16 is dragged on the touch panel 15 in a substantially Y-axis direction (Yes at ST424); and whether the stick 16 is otherwise dragged. Thus, the above-mentioned direction in which the stick 16 is dragged is the substantially X-axis or Y-axis direction, the CPU core 21 deems that there has been an input in either one of the X-axis direction and the Y-axis direction and processes the drag input with the stick 16. Hereinafter, detailed description will be given.

At ST422, when the inclination I is in a range of $-0.2 \leq I \leq 0.2$ (Yes at ST422), that is, when the above-mentioned moving direction is close to the X-axis direction, the CPU core 21 deems that there has been a drag input only in the X-axis direction and corrects the diffY to be 0 (ST4230). In addition, at next ST423, the CPU core 21 scrolls by the diffX in a left/right direction a screen in a current display state (this state corresponds to a state of the screen shown in FIG. 4A, hereinafter similarly corresponding). After ST423, the flow of FIG. 10 is finished.

At ST424, when the inclination I is in a range of $I \leq -5$ or $\geq 5$, that is, when the above-mentioned moving direction is close to the Y-axis direction (Yes at ST422), the CPU core 21 deems that there has been an input only in the Y-axis direction and corrects the diffX to be 0 (ST4250). In addition, at ST425, the CPU core 21 shifts by the diffY a viewpoint, with which a current screen is displayed, back or forth. As a result, the dance hall 41 and the dancers 42 are zoomed in or out. After ST425, the flow of FIG. 10 is finished.

At ST426, the CPU core 21 determines whether or not the inclination I is −5<I<−0.2 or 0.2<I<5. Because of a relationship with ST422 and ST424, this determination is invariably positive and the flow branches only to Yes. Accordingly, this determination is to facilitate understanding of the description. In other words, in the implementation of the CPU core 21, it is not required of the CPU core 21 to perform the determination at ST426. After ST426, the CPU core 21 proceeds to ST427.

At ST427, the CPU core 21 scrolls by the diffX in a left/right direction a screen in a current display state. This processing is similar to the processing at ST423.

At ST428, the CPU core 21 shifts by the diffY the viewpoint, with which a current screen is displayed, back or forth. As a result, the dance hall 41 and the dancers 42 are zoomed in or out.

The above-described processing shown in FIG. 10 brings about the following advantage. Specifically, when the user drags the stick 16 substantially in an x direction or a Y direction, the CPU core 21 comprehends the user's intention by using the determination made with the threshold value and deems that a direction of the drag input has shifted only in the X or Y direction. Accordingly, in a situation where it is difficult for the user to vertically or horizontally move freehand the stick 16 in a precisely straight manner, the user can perform on the game apparatus 10 a vertical or horizontal drag input in a straight manner to some extent, even though the input is not precisely straight. In addition, in the conventional one of Japanese Laid-Open Patent Publication No. 2004-78720, it is only determined that a drag input is performed in a straightly either vertical or horizontal direction. However, in the present invention, the determination is not in the above-mentioned manner but when the user moves the stick 16 in an oblique direction, the user can perform a drag input in the oblique direction on the game apparatus 10. This allows the user to perform a comfortable operation with a high degree of freedom and enables operability of the game apparatus 10 to be enhanced.

Note that ST4230 and ST4250 are to facilitate understanding of the description in which the processing at ST4230 and ST4250 correspond to the correction processing (ST3) shown in FIG. 3, and in the implementation of the CPU core 21, it is not required of the CPU core 21 to perform the processing at these ST4230 and ST4250. It is sufficient for the CPU core 21 to execute ST423 and ST424.

Here, the processing after the flow 102 in FIG. 10 is collectively referred to as ST42.

Example 4

Figure 11:
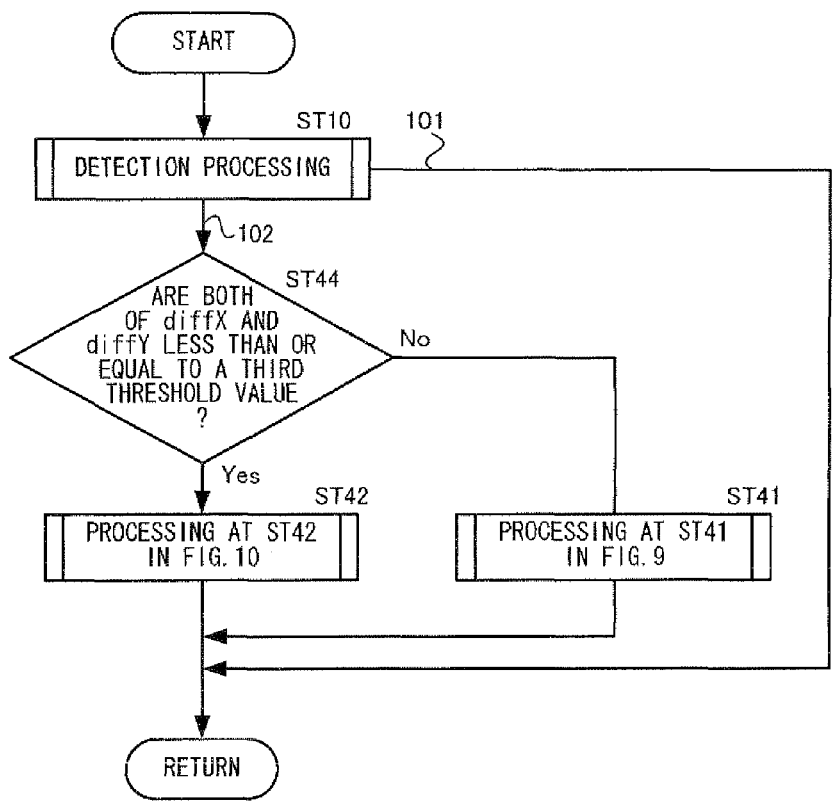
FIG. 11 shows an example 4 of the correction processing and the image formation processing according to the first embodiment.

In FIG. 11, an example 4 of ST3 and ST4 is shown. In FIG. 11, after a flow 102, based on determination at ST44, either of processing at ST41 in FIG. 9 or processing at ST42 in FIG. 10 is performed.

Figure 12:
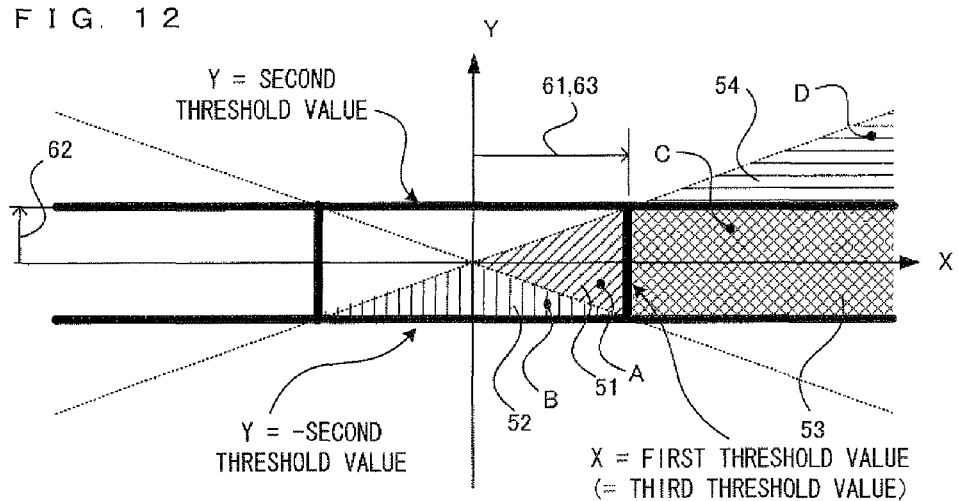
FIG. 12 is a diagram explaining an advantage of the example 4 shown in FIG. 11.

At ST44, it is determined whether or not a condition "diffX≤a third threshold value and diffY≤a third threshold value" is satisfied. When the determination at ST44 is positive, the processing at ST42 in FIG. 10 is performed. When the determination at ST44 is negative, the processing at ST41 in FIG. 9 is performed With reference to FIG. 12, an advantage obtained when the CPU core 21 executes the example 4 shown in FIG. 11 will be described. In FIG. 12, a starting point of a vector (diffX, diffY) of a movement amount is shown as an origin. Hereinafter, as an example, a case where when the stick 16 moves by the vector (diffX, diffY) from the origin shown in FIG. 12, destinations are points A, B, C, and D will be described.

In addition, in the below description, four areas (a first area 51, a second area 52, a third area 53, and a fourth area 54) are used.

Here, the first area 51 is an area enclosed by:

$Y<0.2*X, Y>-0.2*X, X<$(third threshold value 63).

The second area 52 is an area enclosed by:

$Y<0.2*X, Y<-0.2*X, Y>$(second threshold value 62).

The third area 53 is an area enclosed by:

$X>$(third threshold value 63), $Y<$(second threshold value 62), $Y>-$(second threshold value 62).

The fourth area 54 is an area enclosed by:

$Y<0.2*X, X>$(third threshold value 63), $Y>$(second threshold value 62).

Further, hereinafter, for the sake of simplification, the first threshold value and the third threshold value are supposed to be equal to each other. However, the present embodiment is not limited thereto. Herein, a case where a drag input is provided substantially in an X direction is described, and the case is similar to a case where a drag input is provided in a Y direction.

When dragging to a point A in the first area 51 and dragging to a point B in the second area 52 are performed, both of the diffX and the diffY are smaller than the third threshold value. In this case, in the example 4, the determination at ST44 is positive and the processing branches to ST42 (Yes at ST44).

When the determination at ST44 is positive, both of an X component movement amount diffX and a Y component movement amount diffY are small, and a user has difficulty in controlling. When such a subtle input is performed, the CPU core 21 switches to the processing at ST42. By switching to the processing at ST42, even if a user performs dragging in a slightly oblique direction, it does not occur that the drag input is deemed to be 0. In addition, the user can perform an input of a movement amount which is less than or equal to the third threshold value. When a ratio is within a predetermined range, the user's intention to desire dragging in an X direction is comprehended, and processing based on the Y component movement amount is not performed (or the Y component movement amount may be corrected to be 0). In this case, the user can issue an instruction to a game apparatus 10 by performing a subtle dragging operation. As described above, when the movement amount is small (less than the third threshold value), branch processing based on a value of an inclination, as at ST42, is more preferable.

Next, a case where at least one of the diffX and the diffY is greater than or equal to the third threshold value, as in a case where dragging to a point C in the third area 53 and dragging to a point D in the fourth area 54 are performed, will be described. This case is a case where a movement amount of at least one of the diffX and diffY is large. In this case, determination at ST44 is negative and processing at ST41 is performed.

When at least one of the diffX and the diffY is determined as being greater than or equal to the third threshold value 63, it is highly likely that the user has intentionally performed large dragging. For example, even when both of the diffX and the diffY are large but the above-mentioned ratio I is in a range of −0.2≤I≤0.2 as in a case where the dragging to the point D is performed, it does not occur that the CPU core 21 ignores the diffY. Accordingly, even in this case, the user can issue an instruction of zooming-in or zooming-out in accordance with the Y component movement amount. In other words, the game apparatus 10 can receive an input intended by the user. In addition, when the Y component movement amount is less than the second threshold value 62 as in a case where the dragging to the point C is performed, the game apparatus 10 performs only horizontal scrolling and does not perform the zooming-in or zooming-out of the dancers 42 and the like. This allows the CPU core 21 to reflect in a game the user's intention to perform the horizontal scrolling and not to desire to perform the zooming-in or zooming-out. Accordingly, when the movement amount is large (greater than or equal to the third threshold value), the branch processing at ST41 based on the values of the movement amounts diffX and diffY is more preferable.

Example 5

In FIG. 13, an example 5 is shown. Although in the above-described example 1, the equations are used, in this example, the memory card 17 has stored therein a correction table 66 for converting a movement amount to a correction value. Referring to the correction table 66, the CPU core 21 converts an x direction movement amount diffX to a correction value. With respect to a movement amount diffX which is not listed in the correction table 66, the CPU core 21 performs interpolation of correction values listed in the table. It is supposed that in the correction table 66, as the X direction movement amount diffX, values X1, X2, and so forth are listed and as the correction value for the movement amount diffX, A1, A2, and so forth are listed. Further, it is supposed that the movement amount diffX is X3 between X1 and X2. In this case, an interpolated correction value can be calculated by linear interpolation by using a formula:

$$(A1\times(X2-X3)+A2\times(X3-X1))/(X2-X3+X3-X1).$$

In an example of the table shown in FIG. 13, it is supposed that as the x direction movement amount diffX, 0.25, 0.5, 0.75, 1, 2, 3, 4, and so forth are listed, and as the correction value of the x direction movement amount diffX, 0.1, 0.45, 0.71, 1.1, 2.3, 3.2, 4.1, and so forth are listed. Further, it is supposed that the movement amount diffX is 1.2 between 1 and 2. In this case, an interpolated correction value can be calculated by using a formula:

$$(1.1\times(2-1.2)+2.3\times(1.2-1))/(2-1.2+1.2-1)$$

Referring to the correction table 66, the CPU core 21 converts a Y direction movement amount diffY to a correction value. With respect to a movement amount diffY which is not listed in the correction table 66, the CPU core 21 performs interpolation of correction values listed in the table. It is supposed that in the correction table 66, as the Y direction movement amount diffY, values Y1, Y2, and so forth are listed and as the correction value for the movement amount diffY, B1, B2, and so forth are listed. Further, it is supposed that the movement amount diff Y is Y3 between Y1 and Y2. In this case, an interpolated correction value can be calculated by linear interpolation by using a formula:

$$(B1\times(Y2-Y3)+B2\times(Y3-Y1))/(Y2-Y3+Y3-Y1).$$

In an example of the table shown in FIG. 13, it is supposed that as the Y direction movement amount diffY, 0.25, 0.5, 0.75, 1, 2, 3, 4, and so forth are listed, and as the correction value of the Y direction movement amount diffY, 0.09, 0.43, 0.7, 1.0, 2.1, 3.1, 4.1, and so forth are listed. Further, it is supposed that the movement amount diffY is 2.4 between 2 and 3. In this case, an interpolated correction value can be calculated by using a formula:

$$(2.1\times(3-2.4)+3.1\times(2.4-2))/(3-2.4+2.4-4).$$

As shown in FIG. 13, in a case where the X direction movement amount diffX and the Y direction movement amount diffY are small, the memory card 17 may have stored therein data table in which each of the X direction movement amounts diffX and each of the Y direction movement amounts diffY are set to be small and each of the correction values corresponding to these movement amounts is set to be small. In addition, the method of the interpolation of the correction values, shown with reference to FIG. 13, is merely one example and the method in the present invention is not limited to the above-mentioned linear interpolation. The interpolation may be performed by using a curve of the nth order (n is an integer) and a curve of a function such as a sine function, a cosine function, and a logarithmic function.

As in the above-described example 1 through 5 of ST3 and ST4, it is more comfortable for a user upon inputting and operability of the game apparatus 10 can be more enhanced when substitution of a new correct value of the drag input, which is different from the value of the drag input by the user, is performed. Such substitution of the value of the drag input corresponds to the correction processing (ST3) shown in FIG. 3. It is not necessarily required to use the mathematical expressions in the correction processing as in the example 1, and as described in the examples 2 through 4, the correction processing may be performed based on the conditional judgment. As in the above-described examples 2 through 4, the correction processing corresponds to setting one or more of the movement amounts diffX and diffY to be 0. However, performing the processing of dealing with the diffX and the diffY in the image formation processing (ST4) substantially resulting in performing the correction processing (ST3). Accordingly, it is not necessarily required of the CPU core 21 to correct one or more of the values of the diffX and the diffY to be 0.

Hereinafter, supplemental descriptions for the above-described embodiment will be given.

In the above-described examples, the CPU core 21 zooms out (reduces) the screen of the second LCD 12 by the operation of sliding in the downward direction and zooms in (enlarges) the screen of the second LCD 12 by the operation of dragging in the upward direction (see FIG. 4 and FIG. 5). However, the CPU core 21 may zoom in (enlarge) the screen of the second LCD 12 by the operation of sliding in the downward direction and may zoom out (reduce) the screen of the second LCD 12 by the operation of dragging in the upward direction. As described above, the CPU core 21 may zoom in and out the screen of the second LCD 12 by shifting a position of a virtual camera provided in a game space or by changing an angle of view. In addition, instead of shifting the viewpoint in the depth direction in the game space, the CPU core 21 may simply zoom in and out the dance hall 41 and the dancers 42. In addition, the CPU core 21 may move the dancers 42 in the right and left directions, not performing the scrolling described with reference to FIG. 4 and FIG. 5.

In the above embodiment, the example in which the CPU core 21 scrolls the screen in the horizontal direction in response to the drag input in the right or left direction and zooms in or out the screen is described. However, the CPU core 21 may reverse the operation of zooming-in and zooming-out and the operation of scrolling. Specifically, the CPU core 21 may scroll the screen of the second LCD 12 in a vertical direction in response to the drag input in the upward or downward direction and may zoom in or out the screen in response to the right or let drag input. In addition, in the above embodiment, the example in which the CPU core 21 scrolls the screen in the left direction in response to the drag input in the left direction and in the right direction in response to the drag input in the right direction is described. However, the sliding direction and the moving direction of the image may be reverse. Specifically, the CPU core 21 may scroll the screen of the second LCD 12 in the right direction in response to the drag input in the left direction and in the left direction in response to the drag input in the right direction.

In addition, in the above embodiment, as the examples of targets to be zoomed in or out and scrolled as described above, the dance hall 41 and the dancers 42 are cited. However, as the embodiment of the present invention, for example, the CPU core 21 may perform a race game so as to control movement of a lane on which a vehicle runs in response to a drag input in an X-axis direction and so as to change a speed of the vehicle in response to a drag input in a Y-axis direction. Furthermore, among targets which the CPU core 21 can control, the CPU core 21 may control one target based on the diffX and control another target different from the one target, whereby the embodiment of the present invention may be achieved. As these targets to be defined, for example, a game character; a parameter of a background or an image; movement or zooming-in or zooming-out of a game character, a background, and an image; a position of a viewpoint; and the like are included. Furthermore, as these targets to be defined, all kinds of what the CPU core 21 can directly or indirectly control are included. These targets are not limited to what are displayed on the screen but may be what are present on the information processing apparatus or what are present outside of the above-mentioned information processing apparatus.

In addition, as examples of the above-mentioned targets to be controlled, the CPU core 21 may perform control such as movement of a viewpoint in a 3D space and zooming with a camera's angle of view changed. In this case, the above-described correction processing can markedly eliminate a user's discomfort and stress. Specifically, due to a user's hand jiggling caused upon the drag operation, a game in a 3D space is accompanied by movement of a viewpoint. As a result, a screen display largely wavers, thereby easily causing the discomfort and stress on the user. This correction processing allows the CPU core 21 to suppress wavering of the screen display.

In addition, in the example 2 of ST3 and ST4 shown in FIG. 9, the processing in which the CPU core 21 compares the both of the diffX and diffY with the first threshold value and the second threshold value is described. However, the threshold value may be set for only either one of the diffX and diffY. In this case, if the threshold value is set only for the diffX, it is only required to skip the processing at ST304 and ST412. If the threshold value is set only for the diffY, it is only required to skip the processing at ST303 and ST411.

The values of the coefficients, ratio_val and ratio_diff, used in the correction processing are not limited to those shown in the examples. The values may be larger or smaller than those shown in the examples. In particular, in a case where a sum of the coefficients, ratio_val and ratio_diff, exceeds 1 (one), an operation is performed based on an amount larger than an actual change amount.

In addition, as a modification example of the above-described embodiment, values obtained by multiplying the change amounts diffX and diffY by coefficients may be used. For example, diffX=fn(diffX) may be substituted for the change amounts diffX and diffY obtained by the drag input by the correction processing. Here, since the operation on the game apparatus 10 of the above-described embodiment is based on the drag operation, it is preferable that the game apparatus 10 performs, as the image formation processing (ST4), some analog operation in which a direction and a speed of dragging are reflected. For example, with respect to a change in a size of a character based on movement of a viewpoint in a three-dimensional game space, it is preferable that the CPU core 21 controls the above-mentioned target by using a function fn(diffX). In addition, it is preferable that as the target to be controlled by the CPU core 21, something (an object appearing in the screen, a device inside or outside the game apparatus 10, etc.) whose state can be continuously changed is adopted, since the direction and speed of dragging and the above-described correction processing (ST3) can be reflected. In addition, in a case where a state cannot be continuously changed, it is preferable that as the target to be controlled, something whose above-mentioned state is changed in three or more manners is used.

The CPU core 21 may determine, by storing a time duration for which the touch operation is performed, whether the drag operation is performed or simply, the touch operation is performed. This allows an expectation that high flexibility can be attained in the operation of the game apparatus 10. As a method of this determination, if the movement is performed within a given area for a time duration of a predetermined period or more of a plurality of frames, the CPU core 21 may determine that stopping at the same coordinates, not dragging, is performed (in other words, the CPU core 21 may determine that the touch operation is performed).

In addition, as another example other than the examples 1 through 4, the processes in the above-described examples 1 through 4 may be combined.

In the above-described embodiment, the CPU core 21 performs the operation of the flow shown in FIG. 3 and FIGS. 7 through 11 each one frame period. However, the CPU core 21 may perform the above-mentioned operation each period of a plurality of frames, not each one frame period. In addition, the CPU core 21 may perform the operation of the flow shown in FIG. 3 and FIGS. 7 through 11 each predetermined time period. As another embodiment, the change amounts diffX and diffY obtained at ST10 or at ST24 and ST25 may be supposed to be amounts changed from when the touch operation is started to when the touch operation is finished (that is, to when the touch operation is not detected).

The above descriptions of FIG. 1 and FIG. 2 are given by using the blocks separated for each function. However, in the implementation, these blocks may be configured such that any of these are integrated so as to have a plurality of functions or these blocks may be configured such that one of the blocks is divided into a plurality of blocks. As for allocation of functions of the blocks, other variation may be employed, a function of one part of one of the blocks may be performed as a function of other of the blocks. For example, in the above-descriptions, it is the CPU core 21 that mainly executes the flow shown in FIG. 3. However, by providing a sub-microcomputer or the like for carrying out a part of the processing performed on the game apparatus 10, the processing in the above-described embodiment may be performed. In addition, the detection processing (ST10) may be performed as a separate flow. In the touch processing program 241, an X component movement amount diffX 247 and a Y component movement amount diffY 248 generated by using another program may be inputted.

The descriptions (greater than or equal to; less than or equal to; less than; and exceeding) and signs such as "$\leq$" and "$<$" used for representing a comparison of a magnitude may be applied so as to be replaced with one another. In other words, it is only required to perform the determinations based on the threshold values, and which of the signs, "$\leq$" (greater than or equal to) or "$<$" (exceeding but not equal to), is applied is of no technical significance.

The above-described embodiment is applicable to not only the game apparatus but also a mobile terminal. In a case where the embodiment is applied to the mobile terminal, as the above-mentioned target to be controlled, all kinds of what can be controlled by the mobile terminal can be included. For example, scrolling of a screen, zooming-in and zooming-out of the screen, starting a predetermined program, controlling of a device externally connected, and the like can be included.

The CPU core 21 may perform the above-described processing by replacing the first threshold value, the second threshold value, and the third threshold value with other values. In addition, although it is preferable that the CPU core 21 performs the correction processing (ST3), in the embodiment of the present invention, it is not necessarily indispensable to perform the correction processing. In addition, among the components of the above-described embodiment, in the embodiment of the present invention, the components other than the pointing device such as the touch panel 15, the display devices such as the first LCD 11 and the second LCD 12 (or components outside the information processing apparatus), the configuration for executing the touch processing program 241, and the above-mentioned targets to be controlled by the CPU core 21 by inputting the X component movement amount diffX and the Y component movement amount diffY are not indispensable. As the pointing device, a mouse may be used, instead of the touch panel 15. In a case where the mouse is used, a moving operation performed by pressing a button corresponds to the drag operation. In addition, it is not required to provide both of the LCDs (first LCD 11 and second LCD 12) It is not required to provide the touch panel 15 on the second LCD 12.

While the example embodiment presented herein has been described in detail, the foregoing description is in all aspects illustrative and not restrictive. It is understood that numerous other modifications and variations can be devised without departing from the scope of the embodiment.

What is claimed is:

1. A non-transitory computer-readable storage medium having stored therein an information processing program which causes a computer in an information processing apparatus including a pointing device to at least perform:
    coordinate detection for detecting coordinates pointed to by the pointing device;
    first change amount calculation for calculating a change amount of the coordinates in a first direction, the coordinates obtained when inputting is continuously performed by the pointing device;
    second change amount calculation for calculating a change amount of the coordinates in a second direction, the coordinates obtained when inputting is continuously performed by the pointing device;
    first operation for performing a first operation based on the change amount in the first direction, the change amount calculated by the first change amount calculation; and
    second operation for performing, based on the change amount in the second direction, a second operation that is a different type of operation from the first operation, the change amount calculated by the second change amount calculation; wherein
    the first and second change amount calculations respectively calculate the first and second change amounts in a same set of detected coordinates which point in a direction other than the first direction and the second direction, wherein
    the information processing program further causes the computer in the information processing apparatus to perform
    computation for computing the change amount in the first direction and the change amount in the second direction, wherein
    when a value obtained by the computation is within a first predetermined range, the first operation is performed, and when the value obtained by the computation is within a second predetermined range, the first operation is not performed, wherein
    when a value obtained by the computation is within the second predetermined range, the second operation is performed, and when the value obtained by the computation is within the first predetermined range, the second operation is not performed, and wherein
    when the value obtained by the computation is neither within the first predetermined range nor within the second predetermined range, the first operation is performed and the second operation is performed.

2. The non-transitory computer-readable storage medium according to claim 1, wherein
    the information processing program further causes the computer in the information processing apparatus to perform image outputting for outputting an image to a display, wherein
    the first direction is a horizontal direction, wherein
    the second direction is a vertical direction, wherein
    the first operation is an operation of scrolling the image, wherein
    the second operation is an operation of zooming in and out the image, and wherein the image outputting outputs the image formed by the first operation and/or the second operation.

3. The non-transitory computer-readable storage medium according to claim 1, wherein the information processing program further causes the computer in the information processing apparatus to perform:
    first correction value setting for setting a first correction value obtained by correcting the change amount in the first direction based on the change amount in the first direction; and
    second correction value setting for setting a second correction value obtained by correcting the change amount in the second direction based on the change amount in the second direction, wherein
    the first operation is performed based on the first correction value, and wherein
    the second operation is performed based on the second correction value.

4. The non-transitory computer-readable storage medium according to claim 3,
    wherein the first correction value setting sets the first correction value of this time based on the first correction value which has been set last time and on the change amount of this time in the first direction, and
    wherein the second correction value setting sets the second correction value of this time based on the second correction value has been set last time and on the change amount of this time in the second direction.

5. The non-transitory computer-readable storage medium according to claim 3,
    wherein the first correction value setting
        calculates an attenuation value by multiplying the first correction value by a value being larger than 0 and smaller than 1 and
        sets, as the first correction value of this time, a sum of a value obtained by multiplying the attenuation value by a first coefficient and a value obtained by multiplying the change amount in the first direction by a second coefficient, wherein the second correction value setting calculates an attenuation value by multiplying the second correction value by a value being larger than 0 and smaller than 1 and sets, as the second correction value of this time, a sum of a value obtained by multiplying the attenuation value by a third coefficient and a value obtained by multiplying the change amount in the second direction by a fourth coefficient.

6. The non-transitory computer-readable storage medium according to claim 3, wherein when the change amount in the first direction is greater than or equal to a predetermined value, the first correction value setting sets the change amount in the first direction as the first correction value, and when the change amount in the first direction is less than the predetermined value, the first correction value setting sets the first correction value to be 0, and wherein when the change amount in the second direction is greater than or equal to a predetermined value, the second correction value setting sets the change amount in the second direction as the second correction value, and when the change amount in the second direction is less than the predetermined value, the second correction value setting sets the second correction value to be 0.

7. The non-transitory computer-readable storage medium according to claim 3, wherein the information processing program further causes the computer in the information processing apparatus to perform:

computation for computing the change amount in the first direction and the change amount in the second direction, wherein when a value obtained by the computation is within a first predetermined range, the first correction value setting sets the change amount in the first direction as the first correction value and the second correction value setting sets the second correction value to be 0, wherein when the value obtained by the computation is within a second predetermined range, the first correction value setting sets the change amount in the first direction to be 0 and the second correction value setting sets the change amount in the second direction as the second correction value, and wherein when the value obtained by the computation is within a third predetermined range, the first correction value setting sets the change amount in the first direction as the first correction value and the second correction value setting sets the change amount in the second direction as the second correction value.

8. The non-transitory computer-readable storage medium according to claim 1, wherein the computation computes a ratio of the change amount in the first direction and the change amount in the second direction.

9. The non-transitory computer-readable storage medium according to claim 1, wherein the information processing program further causes the computer in the information processing apparatus to perform:

computation for computing the change amount in the first direction and the change amount in the second direction; and third threshold value determination for determining whether or not the change amount in the first direction and/or the change amount in the second direction exceed/exceeds a third threshold value, wherein when the third threshold value determination determines that neither of the change amount in the first direction and the change amount in the second direction exceeds the third threshold value, the first operation is performed when the value obtained by the computation is within a first predetermined range and the first operation is not performed when the value obtained by the computation is within a second predetermined range, and the second operation is performed when the value obtained by the computation is within the second predetermined range and the second operation is not performed when the value obtained by the computation is within the first predetermined range, wherein when the third threshold value determination determines that at least one of the change amount in the first direction and the change amount in the second direction exceeds the third threshold value, the first operation is performed when the first threshold value determination determines that the change amount in the first direction exceeds the first threshold value, and the second operation is performed when the second threshold value determination determines that the change amount in the second direction exceeds the second threshold value, and wherein the third threshold value is set to be greater than or equal to the first threshold value and greater than or equal to the second threshold value.

10. An information processing apparatus including a pointing device and one or more computer processors, comprising:

a coordinate detection unit for detecting coordinates pointed to by the pointing device;

a first change amount calculation unit for calculating a change amount of the coordinates in a first direction, the coordinates obtained when inputting is continuously performed by the pointing device;

a second change amount calculation unit for calculating a change amount of the coordinates in a second direction, the coordinates obtained when inputting is continuously performed by the pointing device;

a first operation unit for performing a first operation based on the change amount in the first direction, the change amount calculated by the first change amount calculation unit;

a second operation unit for performing, based on the change amount in the second direction, a second operation that is a different type of operation from the first operation, the change amount calculated by the second change amount calculation unit; wherein the first and second change amount calculations respectively calculate the first and second change amounts in a same set of detected coordinates which point in a direction other than the first direction and the second direction, wherein the one or more computer processors is configured to at least perform:

computation for computing the change amount in the first direction and the change amount in the second direction, wherein when a value obtained by the computation is within a first predetermined range, the first operation unit performs the first operation, and when the value obtained by the computation is within a second predetermined range, the first operation unit does not perform the first operation, wherein when a value obtained by the computation is within the second predetermined range, the second operation unit performs the second operation, and when the value obtained by the computation is within the first predetermined range, the second operation unit does not perform the second operation, and wherein when the value obtained by the computation is neither within the first predetermined range nor within the second predetermined range, the first operation unit performs the first operation and the second operation unit performs the second operation.

11. An information processing system including a pointing device, comprising:

a coordinate detection unit for detecting coordinates pointed to by the pointing device; and a processing system, including one or more computer processors, configured to:

calculate a change amount of the coordinates in a first direction, the coordinates obtained when inputting is continuously performed by the pointing device;

calculate a change amount of the coordinates in a second direction, the coordinates obtained when inputting is continuously performed by the pointing device;

perform a first operation based on the calculated change amount in the first direction; and perform, based on the calculated change amount in the second direction, a second operation that is a different type of operation from the first operation; wherein the calculated change amounts are in a same set of detected coordinates which point in a direction other than the first direction and the second direction, the one or more computer processors is further configured to at least perform:

computation for computing the change amount in the first direction and the change amount in the second direction, wherein when a value obtained by the computation is within a first predetermined range, the first operation is performed, and when the value obtained by the computation is within a second predetermined range, the first operation is not performed, wherein when a value obtained by the computation is within the second predetermined range, the second operation is performed, and when the value obtained by the computation is within the first predetermined range, the second operation is not performed, and wherein when the value obtained by the computation is neither within the first predetermined range nor within the second predetermined range, the first operation is performed and the second operation is performed.

12. A method for performing an operation in an information processing apparatus, said apparatus including a pointing device, the method comprising:

detecting coordinates pointed to by the pointing device;

calculating a change amount of the coordinates in a first direction, the coordinates obtained when inputting is continuously performed by the pointing device;

calculating a change amount of the coordinates in a second direction, the coordinates obtained when inputting is continuously performed by the pointing device;

performing a first operation based on the calculated change amount in the first direction; and performing, based on the calculated change amount in the second direction, a second operation that is a different type of operation from the first operation; wherein the calculated change amounts are in a same set of detected coordinates which point in a direction other than the first direction and the second direction, computing the change amount in the first direction and the change amount in the second direction, wherein when a computed value is within a first predetermined range, performing the first operation, and when the computed value is within a second predetermined range, not performing the first operation, wherein when a computed value is within the second predetermined range, performing the second operation, and when the computed value is within the first predetermined range, not performing the second operation, and wherein when the computed value is neither within the first predetermined range nor within the second predetermined range, performing the first operation and the second operation.

* * * * *